US012007729B1

United States Patent
Ilic et al.

(10) Patent No.: US 12,007,729 B1
(45) Date of Patent: Jun. 11, 2024

(54) METHOD FOR AUTONOMOUS STABLE ENERGY MANAGEMENT OF AIRCRAFT/SPACECRAFT TURBO-ELECTRIC DISTRIBUTED PROPULSION (TEDP) SYSTEMS

(71) Applicant: New Electricity Transmission Software Solutions, Inc., Sudbury, MA (US)

(72) Inventors: Marija Ilic, Sudbury, MA (US); Kevin Bachovchin, Jefferson Hills, PA (US); Sanja Cvijic, Arlington, MA (US); Jeffrey Lang, Sudbury, MA (US)

(73) Assignee: New Electricity Transmission Software Solutions, Inc., Sudbury, MA (US)

( * ) Notice: Subject to any disclaimer, the term of this patent is extended or adjusted under 35 U.S.C. 154(b) by 1348 days.

(21) Appl. No.: 16/174,736

(22) Filed: Oct. 30, 2018

Related U.S. Application Data

(60) Provisional application No. 62/578,984, filed on Oct. 30, 2017.

(51) Int. Cl.
*H02J 1/16* (2006.01)
*G05B 13/04* (2006.01)
*H02J 1/10* (2006.01)

(52) U.S. Cl.
CPC ............... *G05B 13/04* (2013.01); *H02J 1/16* (2013.01); *B64D 2221/00* (2013.01); *H02J 1/10* (2013.01); *H02J 2310/44* (2020.01)

(58) Field of Classification Search
CPC .............. H02J 2310/44; H02J 1/10–16; H02J 3/28–322; H02J 3/46–50; H02P 2101/30; B64D 2221/00
See application file for complete search history.

(56) References Cited

U.S. PATENT DOCUMENTS

| 2007/0102935 A1* | 5/2007 | Sarlioglu | ............... H02P 21/12 |
| | | | 322/47 |
| 2008/0111420 A1* | 5/2008 | Anghel | ..................... H02J 4/00 |
| | | | 307/11 |

(Continued)

FOREIGN PATENT DOCUMENTS

CN 106655166 A * 5/2017 ........... G06F 30/398

OTHER PUBLICATIONS

S. Mashayekh and K. L. Butler-Purry, "An Integrated Security-Constrained Model-Based Dynamic Power Management Approach for Isolated Microgrids in All-Electric Ships," Jan. 9, 2015, in IEEE Transactions on Power Systems, vol. 30, No. 6, pp. 2934-2945 , Nov. 2015. (Year: 2015).*

(Continued)

*Primary Examiner* — Rexford N Barnie
*Assistant Examiner* — David A Shiao
(74) *Attorney, Agent, or Firm* — Hamilton, Brook, Smith & Reynolds, P.C.

(57) ABSTRACT

Disclosed herein are methods and systems for modeling and controlling the disparate components (e.g. generators, storage, propulsors, and power electronics) that comprise an aircraft turbo-electric distributed power (TeDP) system. The resulting control system is hierarchical and interactive. Layer one is the physical electric power system. Layer three is an optimization system that determines set points for system operation. Layer two, in between layer one and layer three, includes nonlinear, fast, dynamic power-electronic controllers that hold the operation of the power system to the desired set points. Communication between these layers ensures feasibility and stability of the controlled operation. Simulations demonstrate that the resulting control system ensures stability and maximum efficiency.

10 Claims, 17 Drawing Sheets

(56) References Cited

U.S. PATENT DOCUMENTS

| | | | | |
|---|---|---|---|---|
| 2010/0102625 A1* | 4/2010 | Karimi | | B60L 50/30 307/9.1 |
| 2013/0297089 A1* | 11/2013 | Fu | | G06F 1/26 700/295 |
| 2014/0197681 A1* | 7/2014 | Iwashima | | B60L 53/55 307/9.1 |
| 2015/0061378 A1* | 3/2015 | Nakagawa | | H02J 1/102 307/9.1 |
| 2016/0236790 A1* | 8/2016 | Knapp | | G08G 5/0021 |
| 2016/0365722 A1* | 12/2016 | Armstrong | | H02H 7/267 |
| 2018/0079515 A1* | 3/2018 | Harwood | | B64D 27/24 |
| 2018/0362181 A1* | 12/2018 | Iwashima | | H02M 3/00 |
| 2018/0366950 A1* | 12/2018 | Pedersen | | H02J 3/381 |

OTHER PUBLICATIONS

Bals, J., Ji, Y., Kuhn, M. R., & Schallert, C., "Model based design and integration of more electric aircraft systems using modelica", Sep. 2009, In Moet forum at European power electronics conference and exhibition. (Year: 2009).*

Armstrong, Blackwelder, Bollman, Ross, Campbell, Jones, and Norman, "Architecture, Voltage, and Components for a Turboelectric Distributed Propulsion Electric Grid", NASA STI Program, National Aeronautics and Space Administration, Jul. 2015, United States.

Ilic, Bachovchin, Cvetkovic, and Miao, "Physics-Based Foundations for Cyber and Market Design in Complex Electric Energy Systems", 53rd IEEE Conference on Decision and Control, Dec. 15-17, 2014, United States.

Bachovchin and Ilic, "Automated Modeling of Power System Dynamics Using the Lagrangian Formulation", International Transactions on Electrical Energy Systems, 2014, United States.

Bachovchin, "Design, Modeling, and Power Electronic Control for Transient Stabilization of Power Grids Using Flywheel Energy Storage Systems", Ph. D. Dissertation, Carnegie Mellon University, 2015, United States.

Ilic, Cvijic, Lang, and Tong, "Optimal voltage management for enhancing electricity market efficiency", PES General Meeting, 2015, United States.

Ilic, Cvijic, Lang, Tong, and Obadina, "Operating Beyond Today's PV Curves: Challenges and Potential Benefits", PES General Meeting, 2015, United States.

Ilic and Zaborszky, "Dynamics and Control of Large Electric Power Systems", John Wiley & Sons, Inc., 2000, United States.

Banerjee, "Dynamics for Engineers", John Wiley & Sons, Ltd, 2005, England.

Ortega, Loria, Nicklasson, and Sira-Ramirez, "Passivity-Based Control of Eurler-Language Systems: Mechanical, Electrical, and Electrochemical Applications", Preface and Table of Contents, Springer-Verlage, 1998, United States.

Bachovchin and Ilic, "Transient Stabilization of Power Grids Using Passivity-Based Control with Flywheel Energy Storage Systems", IEEE Power & Energy Society General Meeting, 2015, United States.

Krein, Bentsman, Bass, and Lesieutre, "On the Use of Averaging for the Analysis of Power Electronic Systems", IEEE Power Electronics Specialists Conference, 1989, United States.

* cited by examiner

500
One port module

510
Two port module

METHOD FOR AUTONOMOUS STABLE ENERGY MANAGEMENT OF AIRCRAFT/SPACECRAFT TURBO-ELECTRIC DISTRIBUTED PROPULSION (TEDP) SYSTEMS

CROSS-REFERENCE TO RELATED APPLICATIONS

This utility patent application claims priority from U.S. provisional patent application Ser. No. 62/578,984, filed Oct. 30, 2017, titled "METHOD FOR AUTONOMOUS STABLE ENERGY MANAGEMENT OF AIRCRAFT/SPACECRAFT TURBO-ELECTRIC DISTRIBUTED PROPULSION (TEDP) SYSTEMS" naming inventors Dr. Marija Ilic, Dr. Kevin Bachovchin, Dr. Sanja Cvijic, and Dr. Jeffrey Lang.

GOVERNMENT FUNDS

This invention was made with government support under contract number NNX15CC89P awarded by the National Aeronautics and Space Administration (NASA). The government has certain rights in the invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2015-2018 New Electricity Transmission Software Solutions, Inc.

BACKGROUND

Field of Technology

This disclosure relates to aircraft and spacecraft manufactures. More specifically, this relates to the control of hybrid turboelectric aircraft and spacecraft systems.

Background

The design and power-electronic control of individual air vehicle energy system components is well understood today. Less consideration has been given to integrating these components into electric power systems that operate in adaptive-conditions-driven ways to ensure fault-tolerance, stability, and efficiency.

Presently much is known about the design and power of electronic control of individual energy system components (e.g. loads, batteries, flywheels), but there is very little systems-based thinking about integrating these different modules to operate in adaptive conditions-driven ways and to ensure fault-tolerance, stability, and efficiency.

There is increasing complexity of the emerging turbo-electric distributed propulsion (TeDP) systems in NASA, commercial, and military aircraft. For example, the TeDP systems required for future NASA (N+3) generation aircraft are similar to terrestrial electric power systems. However, the TeDP systems are more complex, because modeling and controlling their rotating equipment, constant power loads, and large loading swings all require a deeper understanding of the TeDP-interconnected system dynamics than is typically available for terrestrial systems today. A singular challenge is presented by the power-electronically switched equipment that has become an integral part of the dynamic networks that are TeDP systems. Modeling and control of such heterogeneous interconnected components to ensure stable and reliable power provision is a monumental challenge given today's state-of-the-art.

A key technical problem comes from the challenge of designing an alternative efficient and "green" TeDP aircraft system without increasing the overall aircraft weight, while ensuring stable and safe operation for time-varying missions. This can only be achieved by designing controls for the complex TeDP system that utilize rigorous physics-based dynamical models.

Previous state-of-the-art does not offer such dynamic models, and it does not propose the control design that is theoretically sound for guaranteeing performance over wide ranges of operating conditions. Since such dynamic models and controls do not exist, coordinated optimization of schedules for turbines and propulsors cannot be performed.

The prior art resorts to the worst-case design of individual components and does not optimize, nor does it offer, automation for stable dynamics. As a result, it becomes impossible to meet the objective of having efficient, clean, stable, and safe TeDP.

When the TeDP systems are used in future air vehicles, it is essential to ensure their stable, fault-tolerant, and efficient operation. Methods and systems for ensuring this through automated feed-forward and feedback control are essential.

Companies working in this field include Rolls Royce, Boeing, and General Electric.

Description of Prior Art

Prior efforts have focused on simulating response of TeDP and not on control design for meeting dynamic performance metrics, stability in particular. Portions of pre-existing solutions are referenced from the following non-patent literature.

NON-PATENT LITERATURE DOCUMENTS

[NPL-01] M. Armstrong et al., "Architecture, Voltage, and Components for a Turboelectric Distributed Propulsion Electric Grid," NASA/CR-2015-218440, 2015.

[NPL-02] M. Ilic, K. Bachovchin, M. Cvetkovic, and X. Miao, "Physics-Based Foundations for Cyber and Market Design in Complex Electric Energy Systems," in 53rd IEEE Conference on Decision and Control, Los Angeles, 2014, which is hereby fully incorporated by reference.

[NPL-03] K. D. Bachovchin and M. D. Ilić, "Automated Modeling of Power System Dynamics Using the Lagrangian Formulation," International Transactions on Electrical Energy Systems, 2014, which is hereby fully incorporated by reference.

[NPL-04] K. D. Bachovchin, "Design, Modeling, and Power Electronic Control for Transient Stabilization of Power Grids Using Flywheel Energy Storage Systems," Carnegie Mellon University, Pittsburgh, Ph. D. Dissertation 2015, which is hereby fully incorporated by reference.

[NPL-05] M. D. Ilic, S. Cvijic, J. H. Lang, and J. Tong, "Optimal Resource Management for Enhancing Electricity Market Efficiency," in PES General Meeting, Denver, CO, 2015, which is hereby fully incorporated by reference.

[NPL-06] M. D. Ilic, S. Cvijic, J. H. Lang, J. Tong, and D. Obadina, "Operating Beyond Today's PV Curves: Challenges and Potential Benefits," in PES General Meeting, Denver, CO, 2015, which is hereby fully incorporated by reference.

[NPL-07] M. D. Ilic and J. Zaborszky, Dynamics and Control of Large Electric Power Systems. New York: John Wiley & Sons, 2000.

[NPL-08] S. Banerjee, Dynamics for Engineers. London: John Wiley & Sons, 2005.

[NPL-09] R. Ortega, A. Loria, P. Nicklasson, and H. Sira-Ramirez, Passivity-based Control of Euler-Lagrange Systems: Mechanical, Electrical and Electromechanical Applications. New York: Springer Verlag, 1998.

[NPL-10] K. D. Bachovchin and M. D. Ilić, "Transient Stabilization of Power Grids Using Passivity-Based Control with Flywheel Energy Storage Systems," in IEEE Power & Energy Society General Meeting, Denver, 2015, which is hereby fully incorporated by reference.

[NPL-11] P. T. Krein, J. Bentsman, R. M. Bass, and B. C Lesieutre, "On the use of averaging for the analysis of power electronic systems," IEEE Transactions on Power Electronics, vol. 5, no. 2, pp. 182-190, April 1990.

Since the turboelectric distributed propulsion (TeDP) systems are at their infant stages, there exists a major need for computer-aided methods and systems that assist rapid modeling, development, and control design. Particularly challenging is on-line control system design to support stable power provision in both aircraft and spacecraft systems. The TeDP systems have the potential to provide highly flexible power to air vehicles in response to their requirements for power during both normal and extreme conditions.

What is needed, therefore, is a framework for systematic integration of components that is capable of meeting seemingly conflicting sub-objectives, namely having efficient, clean, stable, and safe TeDP.

BRIEF SUMMARY

Disclosed herein are methods and systems for modeling and controlling the disparate components (e.g. generators, storage, propulsors, and power electronics) that comprise an aircraft turbo-electric distributed power (TeDP) system. The resulting control system is hierarchical and interactive. Layer one is the physical electric power system. Layer three is an optimization system that determines set points for system operation. Layer two, in between layer one and layer three, includes nonlinear, fast, dynamic power-electronic controllers that hold the operation of the power system to the desired set points. Communication between these layers ensures feasibility and stability of the controlled operation. Simulations demonstrate that the resulting control system ensures stability and maximum efficiency.

Features and Advantages

One feature is that the dynamic models derived for all components, as well as for the interconnected system, are in the so-called standard state space form, which is necessary for systematic control design. The advantage of this feature is that it makes it possible to pose a control design problem by thinking about TeDPs as complex Lagrangian (or Hamiltonian) systems for which we can design modular control and guarantee performance of the interconnected system. To the best of our knowledge, such dynamic models—with the physical detail needed for designing fast power electronically controlled switching to ensure provably stable TeDP systems—do not otherwise exist at present. The traditional emphasis has been, instead, on models for simulating dynamic response, and not for model-based control design. Our main premise is that control design for both components and the interconnected system will become essential when the system is operated closer to its stability limits to improve efficiency and to address environmental concerns. In particular, nonlinear control design will become critical to ensure the reliable and safe provision of power during sudden major equipment failures, such as engine or generation unit, or propulsion. Moreover, as the TeDP systems are designed with secondary power components, their coordination must be executed in a systematic way by viewing them as complex dynamic systems. Extensive scenario analyses focused on enhancing component-level control designs only—and expert-based tuning of these—will no longer be sufficient to ensure stability and safety during abnormal conditions. This modeling approach targeted to systematic control design sets the foundation for interactive hierarchical control for these systems, which is based on the inclusion and understanding of the dynamics of the system for contingency assessment and management using both state and state transition information.

Another feature is that the dynamics are based on a Lagrangian modeling of next-generation electric power systems for aircraft with distributed electric propulsion. When using the Lagrangian formulation, the dynamic model is derived from the physical energies of the system.

Another feature is that we apply nonlinear passivity-based control logic in order to ensure stable and safe delivery of power over a wide range of aircraft operating conditions dictated by the power demand specifications for next-generation aircraft. When designing passivity-based controls, the control law is derived from closed-loop energy functions which have desirable properties. This energy-based formulation for both modeling the dynamics and for designing their control is ideal for analyzing the different types of energies in future aircraft systems.

Another feature is that the actual monitoring and decision-making is fundamentally multilayered, both spatially and temporally. The main idea is to embed the complexity into the lower layers, and coordinate optimization by the higher layers interactively with the lower layers. We are applying computationally robust optimization of set-points for controllers to achieve efficient, reliable, and reduced carbon fuel use.

BRIEF DESCRIPTION OF THE DRAWINGS

In the drawings, closely related figures and items have the same number but different alphabetic suffixes. Drawing elements are named for their respective functions.

DETAILED DESCRIPTION, INCLUDING THE PREFERRED EMBODIMENT

Figure 1:
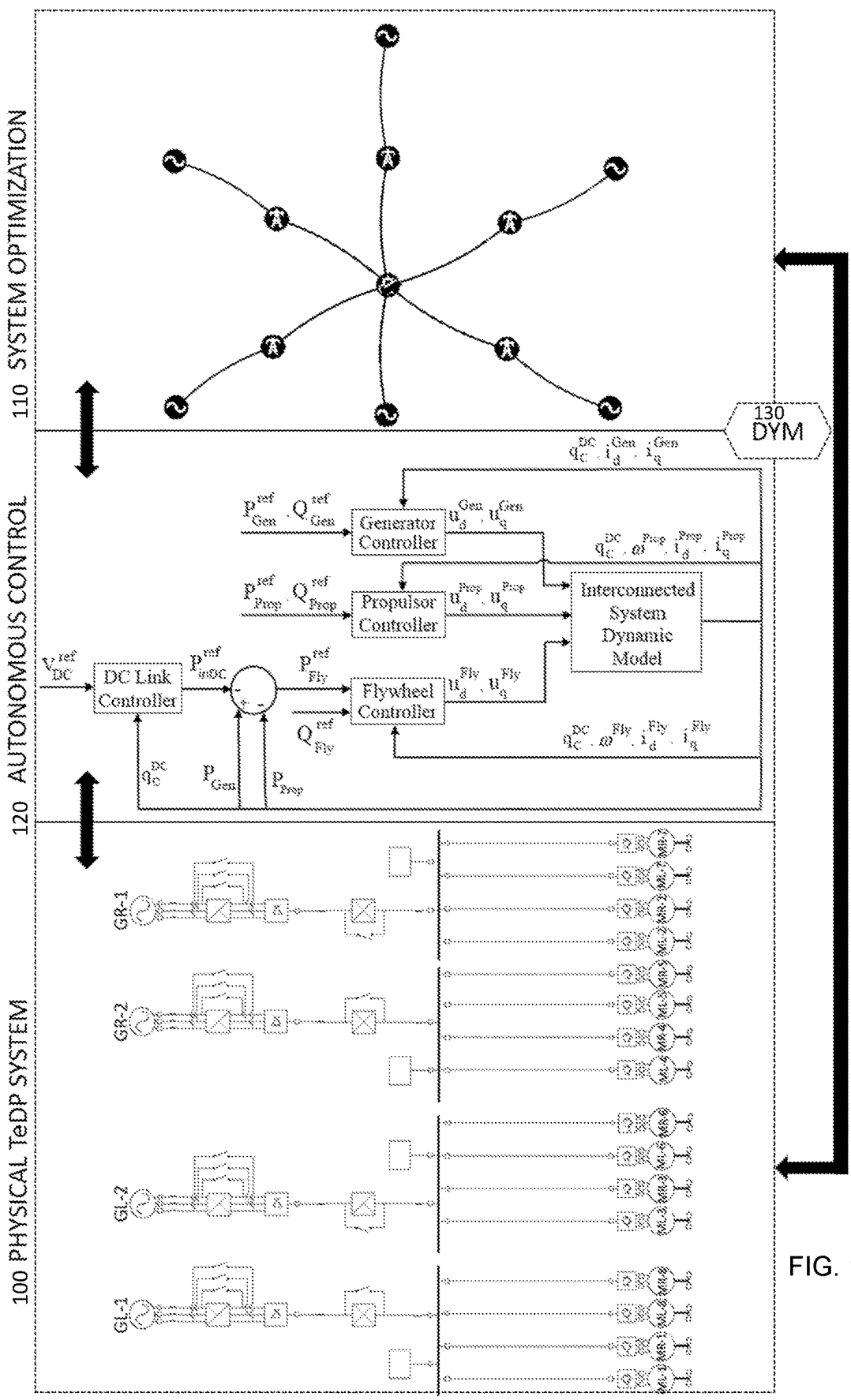
FIG. 1. The interactions of the physical TeDP system (layer one), the autonomous control (layer two), and the system optimization (layer three).

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

A-DyMonDS—same as AirCraft-DyMonDS.

Aircraft-DyMonDS—Aircraft Dynamic Monitoring and Decision Systems is a framework introduced herein for the control of aircraft power systems.

Distributed Propulsion (DP) is a type of powered flight propulsion system for fixed-wing aircraft in which engines are distributed about a vessel. Its goal is to increase performance in fuel efficiency, emissions, noise, landing field length and handling performance. DP is typically accomplished by spanwise distribution of partially or fully embedded multiple small engines or fans along the wing. Alternatively, it may involve ducting exhaust gases along the wing's entire trailing edge (en.wikipedia.org/wiki/Distributed_propulsion).

DP—same as Distributed Propulsion.

DYM—same as DyMonDS.

DyMonDS—same as Dynamic Monitoring and Decision Systems.

Dynamic Monitoring and Decision Systems (DyMonDS) is framework introduced herein for the control of terrestrial power systems. It includes the combination of the autonomous control (second layer) and the system optimization (third layer).

Layer one—the physical electric power system.

Layer two—in between layer one and layer three, includes nonlinear, fast, dynamic power-electronic controllers that hold the operation of the power system to the desired set points.

Layer three—a global optimization system that determines set points for system operation.

NETSS—New Electricity Transmission Software Solutions, Inc. (a Delaware corporation), the assignee of this patent document.

NETSSWorks—software developed by NETSS that is used in layer three.

TeDP—Turbo-Electric Distributed Propulsion.

Operation

The methods and systems described herein enables a understanding of, and the creation of a control description for, TeDP systems that is similar (in a broad sense) to our understanding of stable operation in the changing terrestrial electric-power utility systems.

This data-enabled autonomous stable management of turbo-electric distribution systems in aircrafts and spacecrafts embodies interactions of (a) system-level feed-forward optimization of controller settings for anticipated missions and (b) fast, nonlinear, feedback controller logic for stabilizing system operation to these set points. This is achieved by designing controls for the complex TeDP system that utilize rigorous physics-based dynamic models and advanced Lagrangian/Hamiltonian passivity-based control for complex systems. The complex model of an interconnected TeDP is obtained in automated way and, as such, it lends itself to rapid development and prototyping.

The methods and systems described herein include on-line feed-forward adjustment of set points on the controllable equipment within a TeDP system as new missions are anticipated. The controllers embedded in the physical equipment are highly adaptive, and, for the range of missions, autonomously ensure stable response to changes in these set points. They are fault tolerant with respect to communication failures in between the higher level scheduler of set points and the physical equipment. In rare situations, when control set points are set for conditions outside of the design specifications, the controllers will signal to the higher level the need for further adjustments of system-level requirements.

This is demonstrated below by (1) choosing two example aircraft electric power systems (Architecture #1 and Architecture #2) and developing dynamic models for them; (2) deriving system set points that constitute optimized allocations of resources under various aircraft operating conditions; (3) developing stabilizing controllers for system operation around the set points; and (4) carrying out simulations (Scenario #1, Scenario #2, and Scenario #3) to demonstrate that the controllers stabilized the electric power system dynamics around the prescribed set points.

Referring now to FIG. 1. Shown at the lowest level in the figure (layer one) is the physical TeDP system 100. At the highest level in the figure (layer three) is the optimization system 110 used to determine optimal set points for the operation of the TeDP system. The optimization system is preferably implemented by the NETSSWorks software developed by NETSS. Shown in between layer one and layer three in FIG. 1 is a layer (layer two) of dynamic controllers 120 that hold the operation of the TeDP to the desired set points. Communication between these layers as shown is essential for ensuring both the feasibility and the stability of the controlled operation. Together, layer two and layer three form the Dynamic Monitoring and Decision Systems (DyMonDS) 130. Physical connections for communications are hierarchically structured. The top layer computes the set points, and sends them via top down communication links to the physical components. In cases when lower level controllers fail to stabilize system dynamics in response to the set points, a bottom-up communication link communicate this to the coordinating higher layer. In that case the set points are recomputed and sent to the physical controllers.

Continuing now with FIG. 1. The overall electric power system of interest is complex. The DyMonDS manages this complexity naturally, allowing for the selective multi-layering of the network without loss of system dynamics. Dynamics of components and their autonomous control are derived using general energy physical laws from classical mechanics; these are expressed in terms of Lagrangians or Hamiltonian equations. Similarly, the interconnected system dynamics reflect the most general conservation laws—in particular conservation of energy—at the interfaces of components themselves. The modeling is automated as it models Lagrangian dynamics of all the main components of the electric aircraft system and then combines them automatically into a system model.

Figure 2:
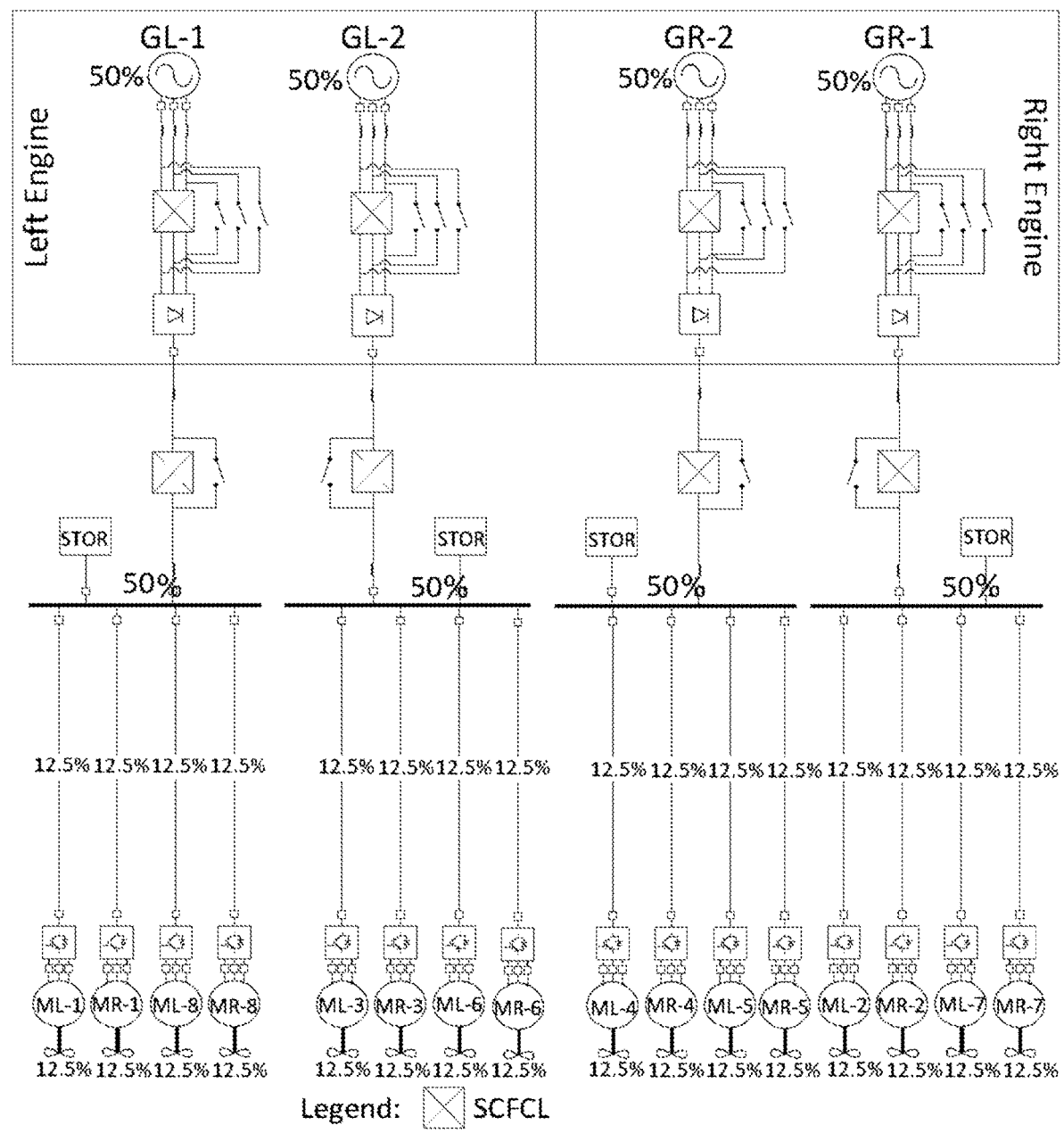
FIG. 2. Distributed electric propulsion power system of Architecture #1.

FIG. 2 shows the distributed electric propulsion power system of Architecture #1.

Figure 3:
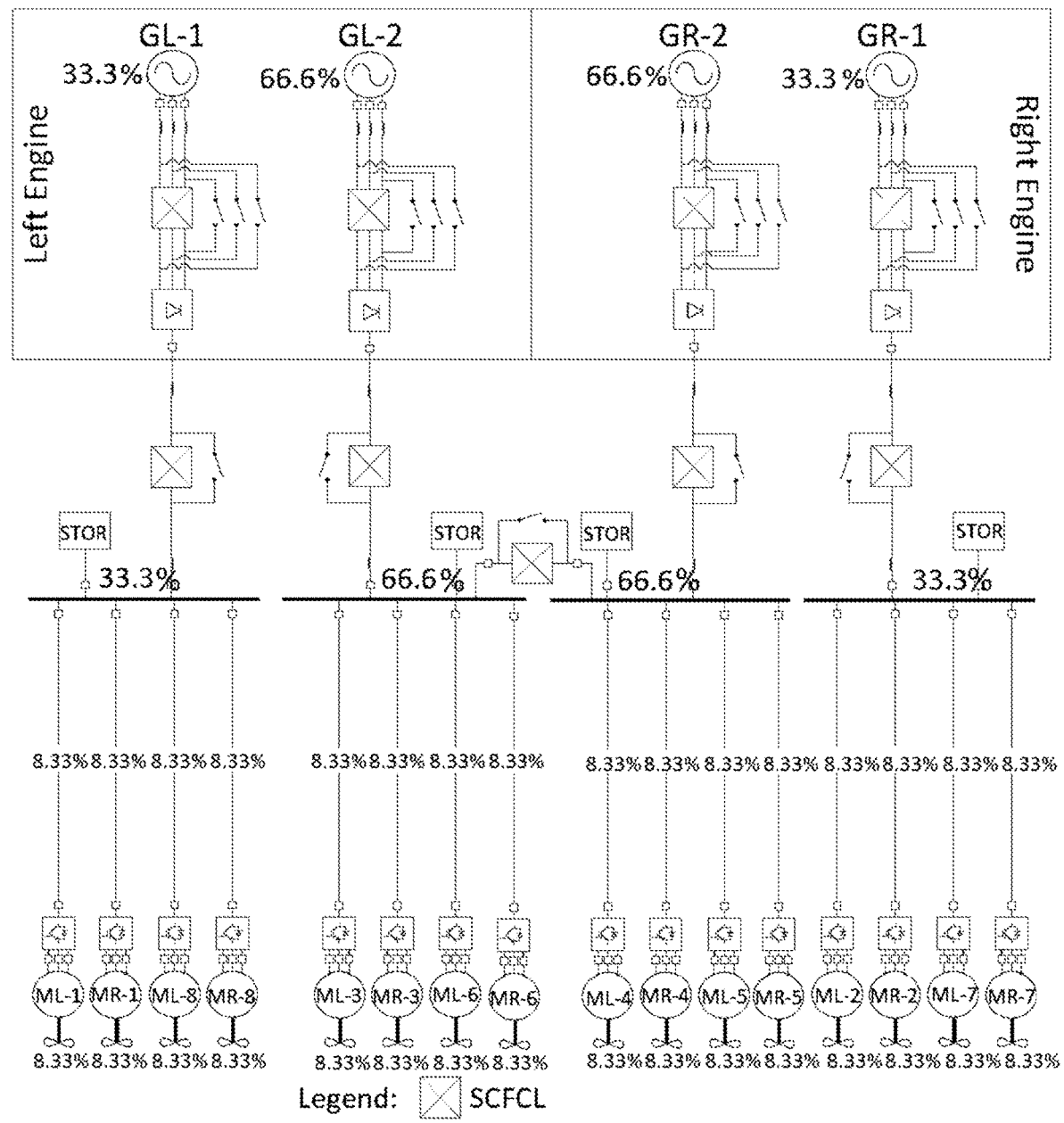
FIG. 3. Distributed electric propulsion power system of Architecture #2.

FIG. 3 shows the distributed electric propulsion power system of Architecture #2.

Figure 4:
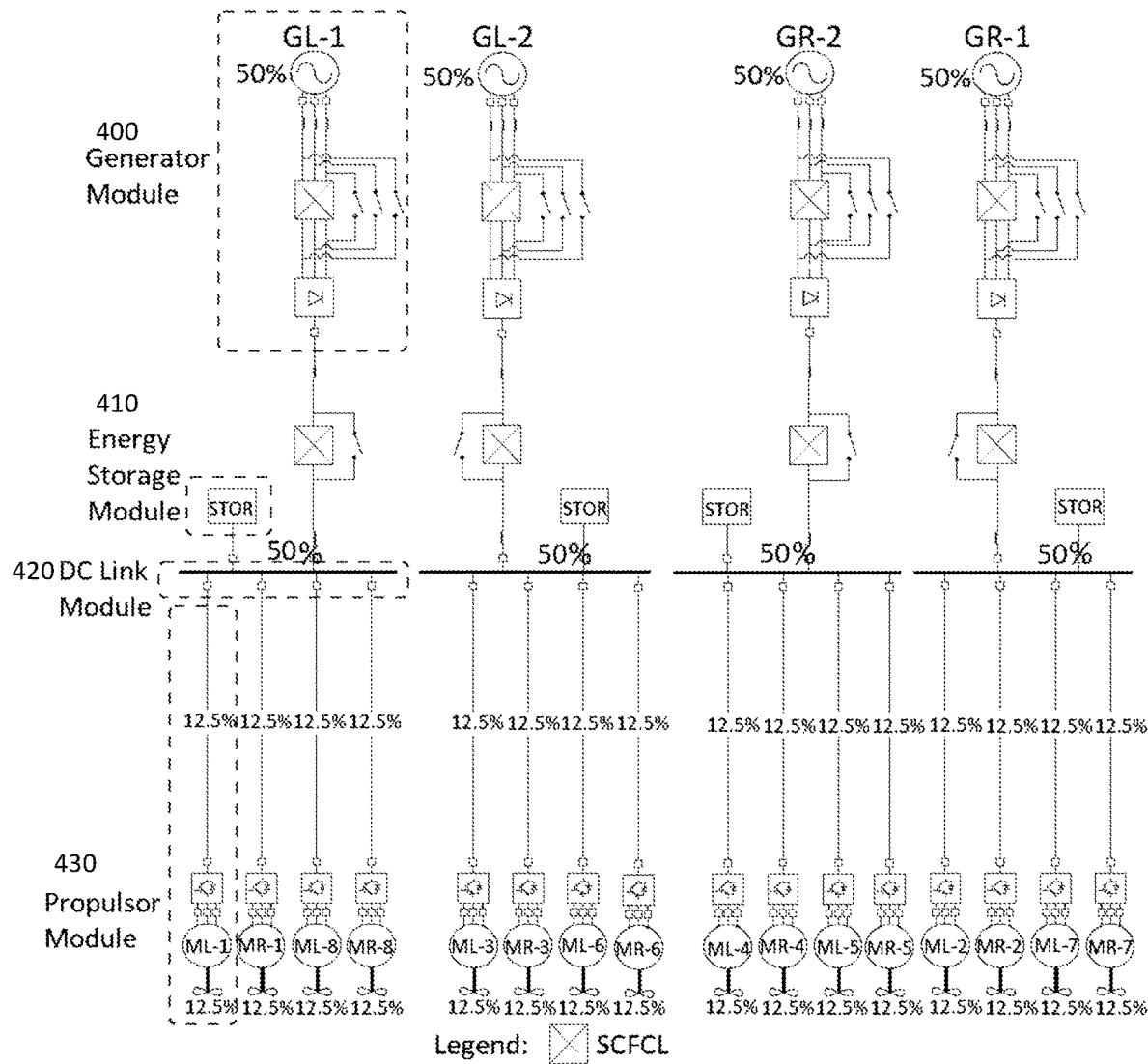
FIG. 4. Decomposition of distributed electric propulsion power system of Architecture #1 into modules.

Referring also to FIG. 4, the decomposition is shown of distributed electric propulsion power system of Architecture #1 (shown in FIG. 2) into modules, including one or more generator modules 400, one or more energy storage modules 410, one or more DC link modules 420, and one or more propulsor modules 430. One or more rectifiers are included in the generator modules, and one or more inverters are included in the propulsor modules. This architecture and its parameters illustrate the systems and methods disclosed herein. Without loss of generality, one can model the dynamics of TeDP components utilizing an automated modeling approach (1) to simulate dynamics of the interconnected TeDP system and (2) to show the effects of different controllers on the closed-loop TeDP dynamics. The same architecture is then used to demonstrate autonomous stable energy management of a TeDP. The figures below illustrate (1) the different steps of modeling and (2) the resultant autonomous control.

To model the open-loop dynamics of aircraft power system components, an automated computer-aided method developed for terrestrial power systems [NPL-03] was extended to aircraft power systems. The automated method symbolically derives the nonlinear dynamics of power systems using the Lagrangian formulation from classical mechanics, where the model is derived from the physical energies of the system. With this automated approach, the user specifies the power system topology, and the code symbolically solves for the dynamics in standard state space form.

In the equations, the left hand side (LHS) denotes the time derivative of system state vector, and the right hand side (RHS) represents its dependence on states and control used. This form is always the starting point for systematic provable control design in complex dynamical systems. The automation of this modeling process is valuable, because even for a small interconnected power system, it is a complex and tedious process to derive the state space model by hand. One advantage of the Lagrangian formulation is that it provides a unified energy-based framework for analyzing mixed energy systems [NPL-08], such as power systems, which contain coupled electrical and mechanical subsystems, and this formulation also explicitly captures the coupling between subsystems. Another advantage is that the Lagrangian formulation has been shown to be useful at the nonlinear control design stage. For the passivity-based control logic [NPL-09] described herein, closed-loop energy functions with desirable properties are chosen, and the control law is then derived from those closed-loop energy functions.

The dynamic equations for the generator modules, energy storage modules, DC link modules, and propulsor modules are derived by the Lagrangian approach. The automated Lagrangian-based approach [NPL-03] could be used to model the dynamics of the entire interconnected system, but it would be very computationally intensive. To improve the computational efficiency, an automated modular method developed for terrestrial power systems [NPL-02] is used. Using this modular approach, first the dynamics for each individual module k are derived using the Lagrangian approach and expressed in the following common form:

$$\dot{x}_k = f_k((x_k, p_k, u_k, m_k)) \qquad \text{Equation 1:}$$

$$y_k = h_k(x_k, u_k) \qquad \text{Equation 2:}$$

where $x_k$ is the vector of state variables in module k, $u_k$ is the vector of controllable inputs in module k, $m_k$ is the vector of exogenous inputs to module k determined by factors outside the model, and $p_k$ is the vector of port inputs to module k (either currents or voltages) that will be determined by its connection to the rest of the system. Finally, $y_k$ is the vector of outputs (either currents or voltages) that this module sends to its directly connected modules.

Figure 5:
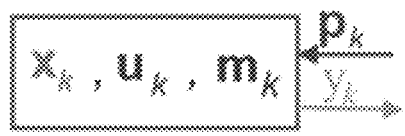
FIG. 5. Visual representation of one-port and two-port modules.
Figure 5:
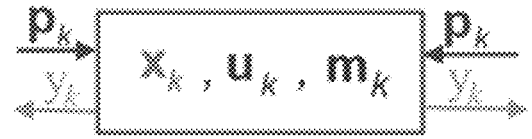

Referring also to FIG. 5, a visual representation is shown of one-port 500 and two-port 510 modules. Aircraft power system components can have either one port per phase (e.g. synchronous machines and loads) or two ports per phase (e.g. electric cables) [NPL-07].

Figure 6A:
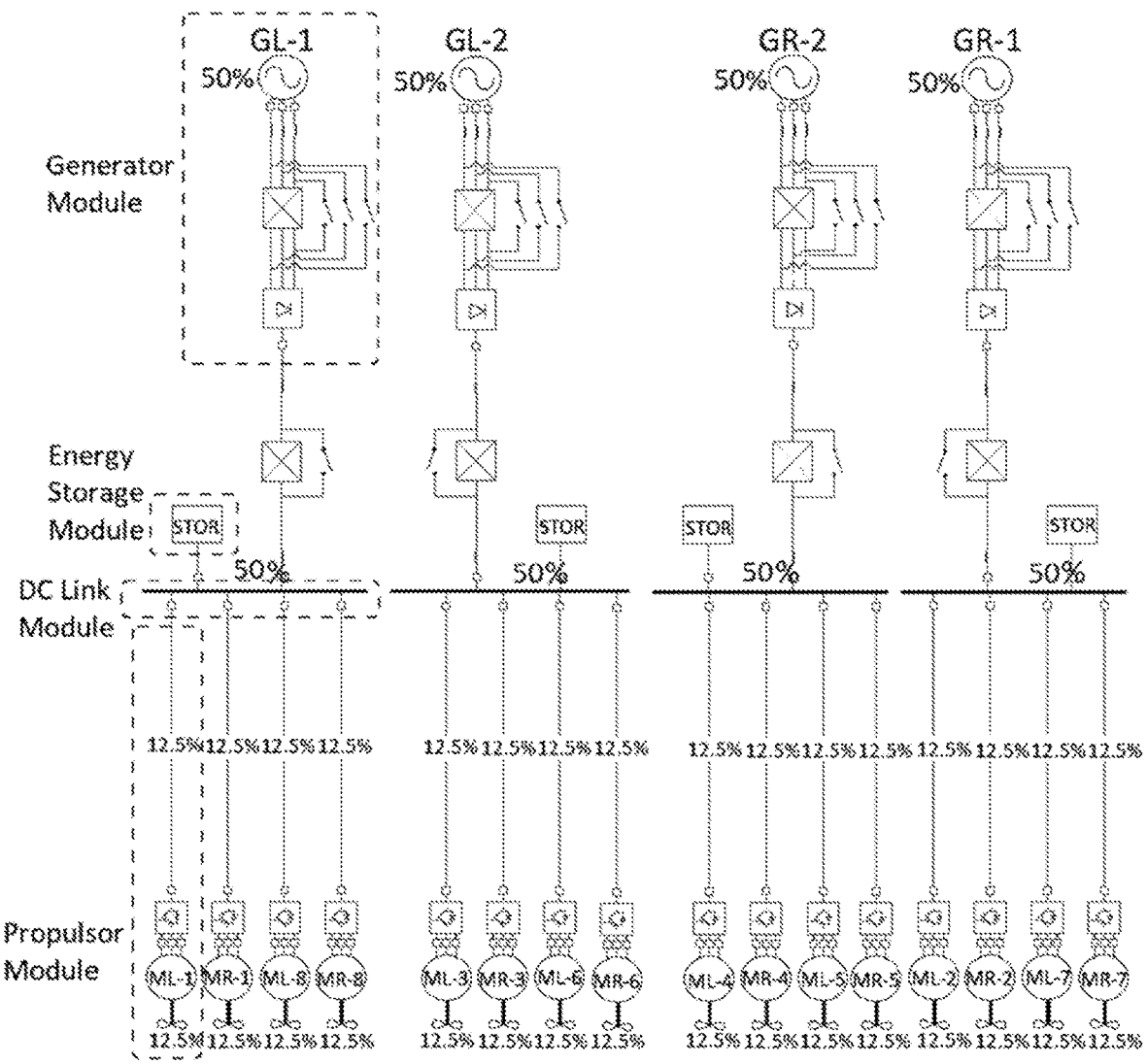
FIG. 6A. Individual modular dynamics for the distributed electric propulsion power system.

FIG. 6A shows individual modular dynamics for the distributed electric propulsion power system. FIG. 6A also shows the state variables, controllable inputs, port inputs, and outputs of each aircraft power system module used to define the dynamic equations in the standard state space form. The variables in this figure are described further below.

Figure 6B:
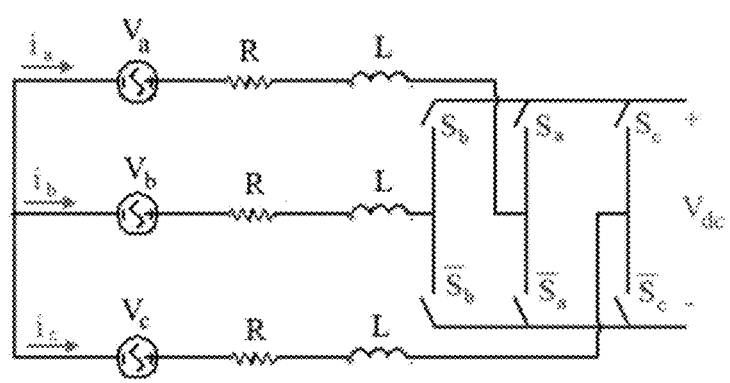
FIG. 6B. A generator module.

FIG. 6B shows a generator module. The generator module includes the generator as well as the rectifier. The generator is modeled as an ideal three-phase voltage source connected in series to a resistance and inductance. The controllable inputs are the positions of the twelve switches in the rectifier. For each of the six switch pairs, the control is designed so that, at any given time, either the top switch or the bottom switch is closed, but not both. The switching functions $u_a$, $u_b$, $u_c$ are defined as:

$$u_k = \begin{Bmatrix} 1 S_k \text{closed} \\ -1 \overline{S_k} \text{closed} \end{Bmatrix} k = a, b, c. \qquad \text{Equation 3}$$

The controllable inputs $u_a$, $u_b$, $u_c$ as defined above are discrete values. Since analysis of discrete control inputs is complex, one common approach is to use state space averaging [NPL-11]. Hence for the generator module, as well as for all subsequent modules, the switching functions $u_a$, $u_b$, $u_c$ are regarded as duty ratio functions with values in the interval (−1, 1), representing the proportion of the time in a duty cycle that the switches are closed.

Using a dq reference frame rotating at the same frequency ω as the ideal voltage source, the dynamic equations for the generator module are:

$$\frac{di_d}{dt} = i_q\omega + \frac{V_d}{L} - \frac{R}{L}i_d - \frac{V_{dc}}{2L}u_d \quad \text{Equation 4}$$

$$\frac{di_q}{dt} = -i_d\omega + \frac{V_q}{L} - R_L i_q - \frac{V_{dc}}{2L}u_q \quad \text{Equation 5}$$

in the form given by:

$$x_k = [i_d i_q]^T \quad \text{Equation 6:}$$

$$u_k = [u_d u_q]^T \quad \text{Equation 7:}$$

$$p_k = [v_{DC}] \quad \text{Equation 8:}$$

$$y_k = [-i_d u_d/2 - i_q u_q/2] \quad \text{Equation 9:}$$

Figure 6C:
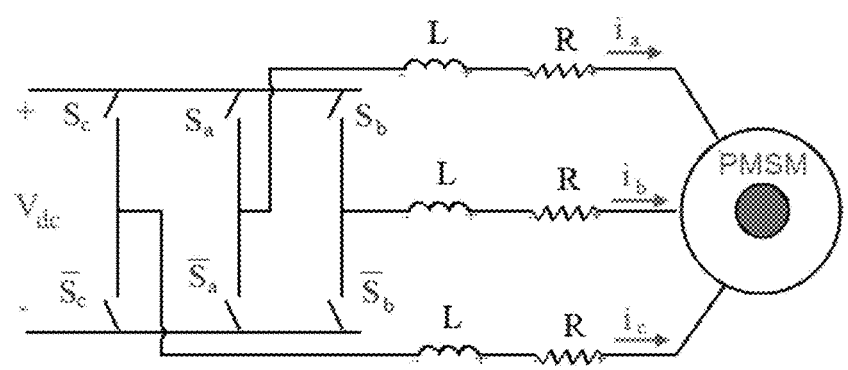
FIG. 6C. A propulsor module.

FIG. 6C shows a propulsor module. The propulsor module includes the propulsor as well as the inverter. The propulsor is modeled as a permanent magnet synchronous machine. The machine is assumed to have a governor control, which adjusts the angle of the blades in order to regulate the speed of the machine. The same switching logic as above is again used for the inverter.

Using a dq reference fixed to the permanent magnet rotor, the dynamic equations for the propulsor module are:

$$\frac{di_d}{dt} = \frac{V_{dc}}{2L}u_d - \frac{R}{L}i_d + Ni_q\omega \quad \text{Equation 10}$$

$$\frac{di_q}{dt} = \frac{V_{dc}}{2L}u_q - \frac{R}{L}i_q - Ni_d\omega - \frac{AN\omega}{L} \quad \text{Equation 11}$$

$$\frac{d\omega}{dt} = \frac{NAi_q - \tau_M - B\omega}{J} \quad \text{Equation 12}$$

$$\frac{d\theta}{dt} = \omega \quad \text{Equation 13}$$

where N is the number of pole pairs and A is the amplitude of the flux induced in the stator windings by the permanent magnet rotor.

The dynamic equations for the governor control are:

$$\frac{d\tau_M}{dt} = -\frac{\tau_M + K_t a}{T_u} \quad \text{Equation 14}$$

$$\frac{da}{dt} = -\frac{K_p(\omega - \omega^{ref}) + K_I \omega_{Int} + ra}{T_g} \quad \text{Equation 15}$$

$$\frac{d\omega_{Int}}{dt} = \omega - \omega^{ref} \quad \text{Equation 16}$$

in the form given by:

$$x_k = [i_d i_q \omega \theta \tau_M a \omega_{Int}]^T \quad \text{Equation 17:}$$

$$u_k = [u_d u_q]^T \quad \text{Equation 18:}$$

$$p_k = [v_{DC}] \quad \text{Equation 19:}$$

$$y_k = [i_d u_d/2 + i_q u_q/2] \quad \text{Equation 20:}$$

The flywheel module (not pictured) is the same as the propulsor (a permanent magnet synchronous machine and an inverter), except that the machine is not assumed to have governor control. The dynamic equations for the flywheel module are given by:

$$x_k = [i_d i_q \omega \theta]^T \quad \text{Equation 21:}$$

$$u_k = [u_d u_q]^T \quad \text{Equation 22:}$$

$$p_k = [v_{DC}] \quad \text{Equation 23:}$$

$$y_k = [i_d u_d/2 + i_q u_q/2] \quad \text{Equation 24:}$$

The DC-link module (not pictured) consists of a single capacitor. The dynamic equation for that capacitor is given by:

$$\frac{dq_C}{dt} = i_{In} \quad \text{Equation 25}$$

in the form given by:

$$x_k = [q_C]^T \quad \text{Equation 26:}$$

$$u_k = [u_d u_q]^T \quad \text{Equation 27:}$$

$$p_k = [i_{In}] \quad \text{Equation 28:}$$

$$y_k = [q_C/C] \quad \text{Equation 29:}$$

Then, given the connection of modules obtained by the system architecture, the state space model for the interconnected system is symbolically derived in an automated manner. As described in [NPL-02], using the Kirchhoff's voltage law and current law equations at each junction, the port inputs to one module are expressed in terms of the outputs of its connecting modules. This allows the dynamics of each module to be expressed as:

$$x_k = f_k(x_k, y_{ck}, u_k, m_k) \quad \text{Equation 30:}$$

where $y_{ck}$ is the vector of outputs in modules adjacent to module k. This approach was used to derive the full state space model for the interconnected power system architectures shown in FIG. 2 and FIG. 3. It should be emphasized that this approach allows the dynamics of the interconnected system to be expressed as an ordinary differential equation (ODE) system rather than a differential algebraic system (DAE) system. It is desirable to express the dynamics of the interconnected power system as an ODE system in standard state space form because this form is needed for designing control with provable performance.

Nonlinear Passivity-Based Control Logic.

Figure 7:
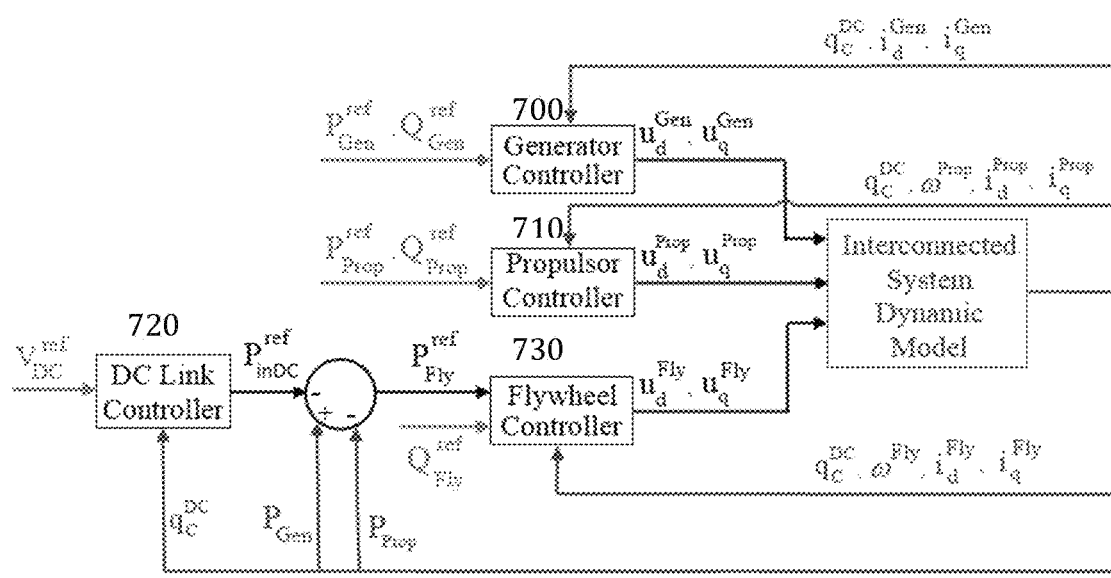
FIG. 7. Controller block diagram for Architecture #1.

Referring also to FIG. 7, a controller block diagram is shown for the distributed electric propulsion power system of Architecture #1. The controllers regulate the DC-link voltage, the real and reactive power out of each generator, the real and reactive power into each propulsor, and the reactive power into the flywheel. These external set points come from a higher-level optimization, described further below. Note that there are actually four propulsor controllers for each electrical system in FIG. 2, but only one is shown in FIG. 2 since each propulsor controller is identical. It should be noted that while the control logic for each propulsor is the same, each propulsor can still have different set points.

The generator controllers 700 choose the duty ratios of the switches in the rectifier in order to regulate the generator real and reactive power to their set points, and the propulsor controllers 710 choose the duty ratios of the switches in the inverter in order to regulate the propulsor real and reactive power to their set points. The outer DC-link controller 720 gives the real set point power to the inner flywheel controller 730 in order to regulate the capacitor voltage. This control strategy relies on the fact that the flywheel controller can regulate the flywheel power much faster than the reference flywheel power changes. Using the flywheel to directly regulate the DC-link voltage allows the size of the capacitor to be reduced in comparison to a design, such as in [NPL-04], where the capacitor voltage was not directly regulated, and hence a large capacitor was needed in order to keep the switch duty ratios within feasible limits.

Each of these controllers in FIG. 7 use passivity-based control logic, applying the automated method introduced in [NPL-10] for symbolically deriving the control law. Using this automated method, the control designer specifies the original state space model, the set point equations, the closed-loop magnetic co-energy, the closed-loop electric energy, and the closed-loop dissipation function, and the automated method symbolically derives the control law in order to achieve this closed-loop behavior. Details about the control derivation for each of these controllers are described below.

For the generator controller, the closed-loop magnetic co-energy and closed-loop electric energy are chosen as:

$$\tilde{W}'_m = \frac{1}{2}L(\tilde{i}_d^2 + \tilde{i}_q^2) \quad \text{Equation 31}$$

$$\tilde{W}_e = 0 \quad \text{Equation 32}$$

The closed-loop Rayleigh dissipation function is chosen as:

$$\tilde{R} = \frac{1}{2}R(\tilde{i}_d^2 + \tilde{i}_q^2) \quad \text{Equation 33}$$

Note that the closed-loop energy and dissipation functions are expressed in terms of the error state variables $\tilde{x}$ where $\tilde{x} = x - x^D$ and $x^D$ denotes the desired state variables. The desired state variables $i_d^D$ and $i_q^D$ are determined by finding the currents such that the real and reactive power into the induced voltage meets the set points. This is done by solving the following two equations for $i_d^D$ and $i_q^D$:

$$P^{ref} = V_d i_d^D + V_q i_q^D \quad \text{Equation 34:}$$

$$Q^{ref} = V_q i_q^D - V_d i_q^D \quad \text{Equation 35:}$$

Given these set points and this closed-loop behavior, the resulting passivity-based control law derived by the automated method in [NPL-04] and [NPL-10] is:

$$u_d = \frac{2V_d}{V_{dc}} - \frac{V_d(P^{ref}R + 2LQ^{ref}) + 2Q^{ref}RV_q - 2LP^{ref}V_q\omega}{V_{dc}(V_d^2 + V_q^2)} \quad \text{Equation 36}$$

$$u_q = \frac{2V_q}{V_{dc}} - \frac{V_q(P^{ref}R + 2LQ^{ref}) - 2Q^{ref}RV_d + 2LP^{ref}V_d\omega}{V_{dc}(V_d^2 + V_q^2)} \quad \text{Equation 37}$$

The propulsor controller regulates the real and reactive power into the induced voltage of the propulsor from the rotating permanent magnet. Again, when deriving the passivity-based control law, the automated method introduced in [NPL-04] and [NPL-10] for symbolically deriving the control law is used.

For the propulsor controller, the closed-loop magnetic co-energy and closed-loop electric energy are chosen as:

$$\tilde{W}'_m = \frac{1}{2}L(\tilde{i}_d^2 + \tilde{i}_q^2) \quad \text{Equation 38}$$

$$\tilde{W}_e = 0 \quad \text{Equation 39}$$

The closed-loop Rayleigh dissipation function is chosen as:

$$\tilde{R} = \frac{1}{2}R(\tilde{i}_d^2 + \tilde{i}_q^2) \quad \text{Equation 40}$$

The desired state variables $i_d^D$ and $i_q^D$ are again determined by finding the currents such that the real and reactive power into the induced voltage meets the set points. This is done by solving the following two equations for $i_d^D$ and $i_q^D$:

$$P^{ref} = V_d i_d^D + V_q i_q^d \quad \text{Equation 41:}$$

$$Q^{ref} = V_q i_q^d - V_d i_q^D \quad \text{Equation 42:}$$

where:
$V_d = 0$
$V_q = AN\omega$

Given these set points and this closed-loop behavior, the resulting passivity-based control law derived by the automated method in [NPL-04] and [NPL-10] is:

$$u_d = \frac{2(Q^{ref}R - LP^{ref}\omega)}{ANV_{dc}\omega} - \frac{2Li_q\omega(N-1)}{V_{dc}} \quad \text{Equation 43}$$

$$u_q = \frac{2(P^{ref}R - LQ^{ref}\omega)}{ANV_{dc}\omega} + \frac{2\omega(AN - Li_d + LNi_d)}{V_{dc}} \quad \text{Equation 44}$$

The flywheel controller has the same power electronics control logic as the propulsor controller, and the switch duty ratios are given by $u_d$ and $u_q$ as defined above. However, it should be noted that, as shown in FIG. 7, the real power set point for the flywheel is not an external set point but rather comes from the DC link controller.

The DC-link controller provides the real power set point for the flywheel in order to regulate the DC-link capacitor voltage to $v_{DC}^{ref}$. The dynamic equation for the DC-link capacitor can be rewritten in terms of input power rather than input current:

$$\frac{dq_c}{dt} = \frac{P_{In}C}{q_C} \quad \text{Equation 45}$$

For the purposes of the DC-link controller, the input power is treated as a controllable input. This control strategy assumes the flywheel can regulate the DC-link input power much faster than the reference input power changes.

The closed-loop magnetic co-energy and closed-loop electric energy are chosen as:

$$\tilde{W}'_m = 0 \quad \text{Equation 46}$$

$$\tilde{W}_e = \frac{1}{2C}\tilde{q}_C^2 \quad \text{Equation 47}$$

The closed-loop Rayleigh dissipation function is chosen as:

$$\tilde{R} = \frac{1}{2}R_a \tilde{i}_C^2 \quad \text{Equation 44}$$

Note that $R_a$ is damping injected to the closed-loop system in order to make the error dynamics asymptotically stable, as described in [NPL-04].

The desired capacitor charge is:

$$q_C^D = C v_{DC}^{ref} \quad \text{Equation 49:}$$

The resulting passivity-based control law is:

$$P_{in}^{ref} = \frac{-q_c(q_c - C v_{DC}^{ref})}{C^2 R_a} \quad \text{Equation 50}$$

The reference flywheel power is then determined from $P_{in}^{ref}$ as well as the power out of the terminal bus of each generator and the power into the terminal bus of each propulsor:

$$P_{Fly}^{ref} = P_{Gen} - P_{Prop1} - P_{Prop2} - P_{Prop3} - P_{Prop4} - P_{in}^{ref} \quad \text{Equation 51:}$$

NETSSWorks Optimization for Setting TeDP Control Set Points.

Figure 8:
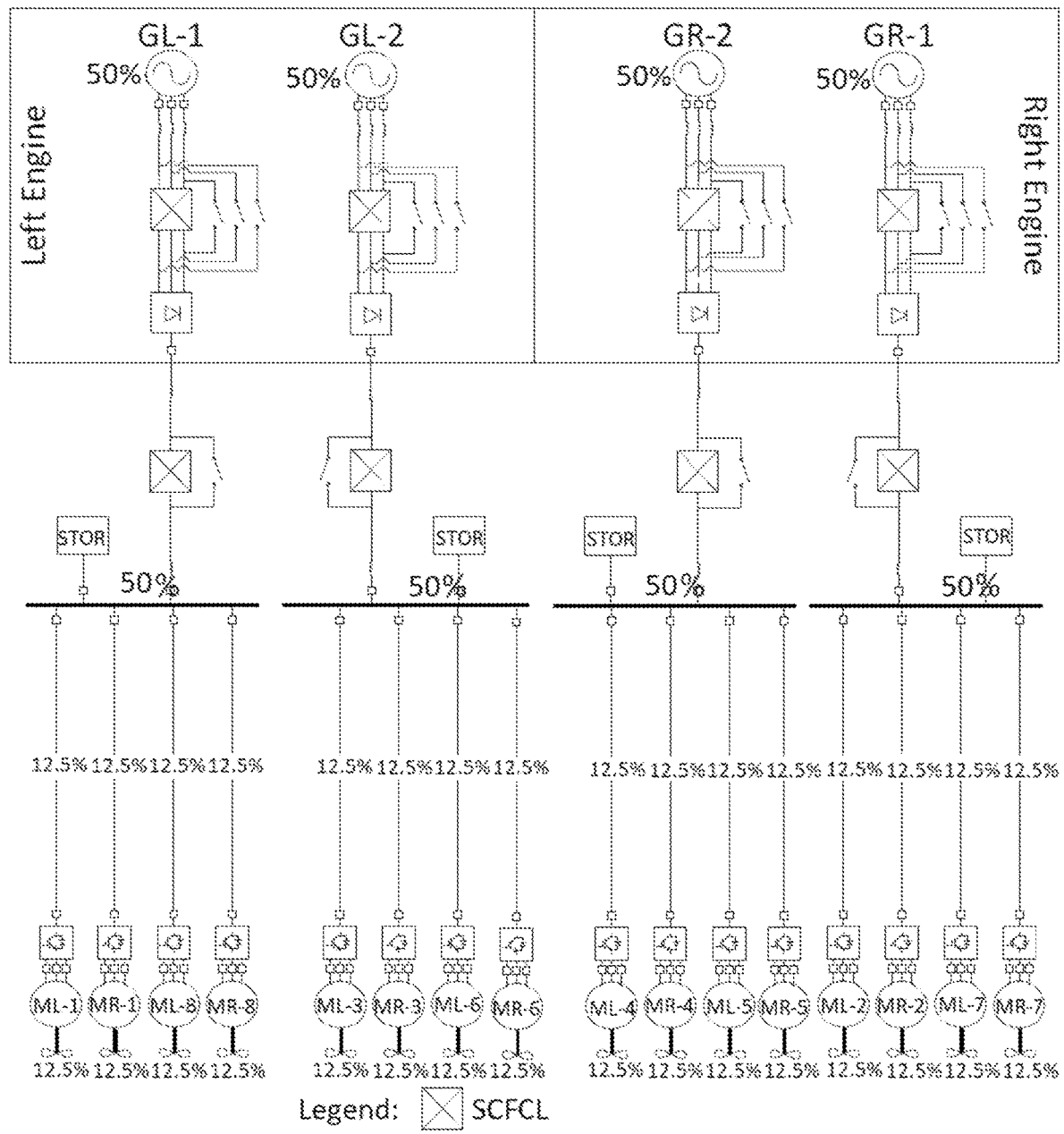
FIG. 8. Example aircraft electric power system.

FIG. 8 shows an example aircraft electric power system.

Figure 9:
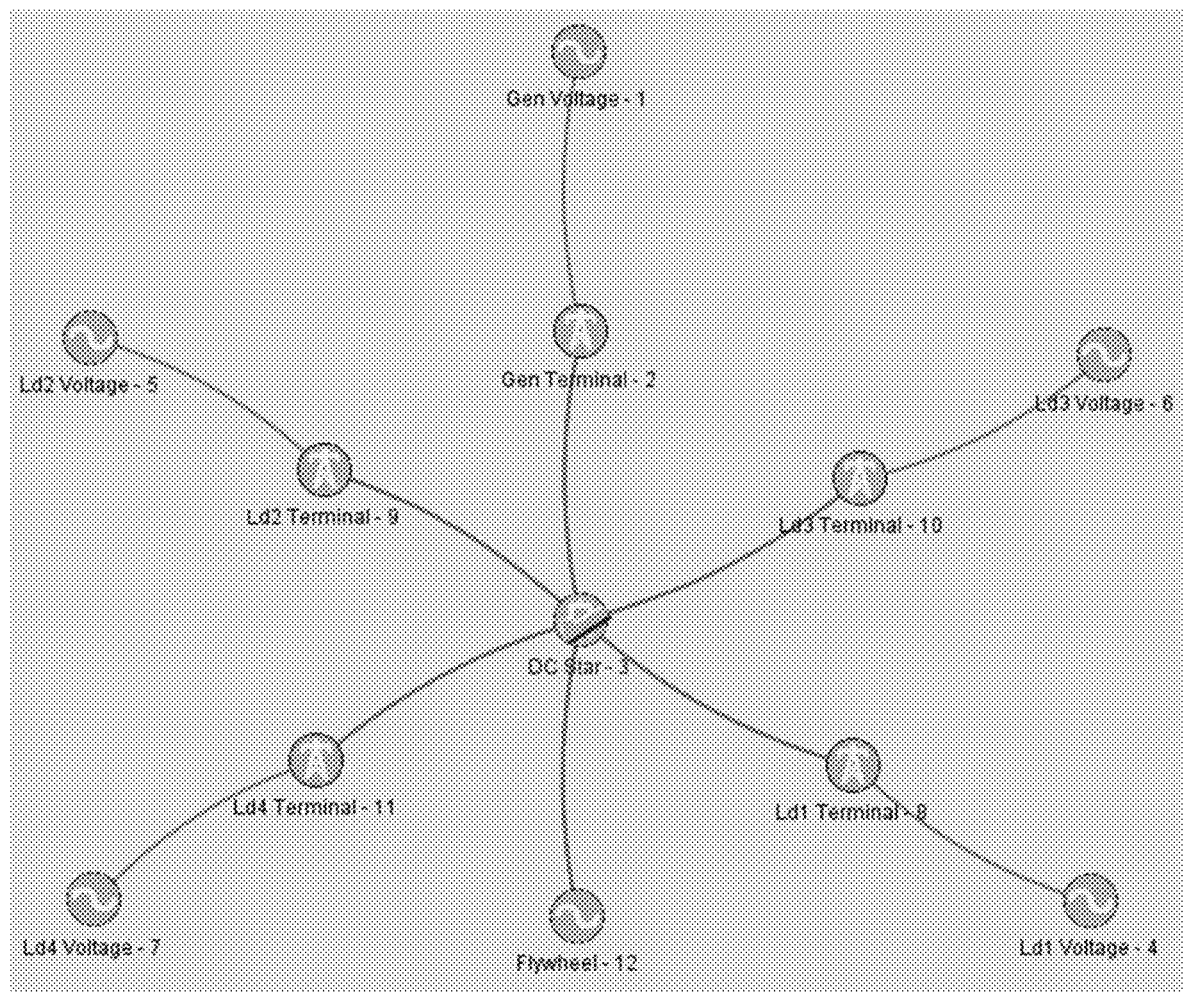
FIG. 9. Screen shot from the NETSSWorks user interface showing the terrestrial equivalent of the quarter aircraft electric power system.

FIG. 9 shows a screen shot from the NETSSWorks user interface showing the terrestrial equivalent of the quarter aircraft electric power system shown in FIG. 8. As shown in FIG. 1, the highest level coordinating controller for TeDP receives requests for power to be supplied to the propulsors as mission conditions vary. This triggers an optimization layer whose objective is to find set points for controllable equipment in the lower layers so that requested power can be delivered in a feasible and stable way to the aircraft. NETSSWorks, a specific optimization software package developed for resource management in large bulk electric power systems by NETSS, is used as the basis for performing—for the first time—a similar function in the TeDP of an aircraft system.

All optimizations reported herein are performed using NETSSWorks [NPL-05] and [NPL-06]. NETSSWorks is an extended optimal-power-flow (OPF) program ordinarily used to optimize the scheduling of resources in terrestrial electric power systems. For the purposes of this patent document, the example aircraft power system is modeled as an equivalent terrestrial electric power system.

NETSSWorks is an extension (XOPF) of traditional OPF programs in two significant ways. First, it offers a variety of optimizations beyond traditional economic dispatch, including demand-side optimizations. Second, it provides optimization sensitivities for all control variables and constraints. One common criticism of OPF programs is that the optimizations they produce often result in the adjustment of all control variables across the electric power system. Such optimized controls are often impractical, if not impossible, to implement. The sensitivities provided by the NETSS XOPF program can be used to identify the most important subset of control adjustments, thereby enabling an approximate optimization that can be more easily implemented. This and other uses of the sensitivities and their use in an autonomous multi-layered system for TeDP in aircrafts are described in some detail in [NPL-05].

The optimization of an aircraft electric power system is illustrated using one quarter of the complete system shown in FIG. 8 taken from [NPL-01]. One quarter of this electric power system comprises one generator, four propulsors, and one flywheel storage unit, all connected through a common DC link. In the configuration shown in FIG. 8, each quarter system operates autonomously from an electrical viewpoint.

To optimize the quarter aircraft electric power system using NETSSWorks, the quarter system is converted to the terrestrial electric power system shown in FIG. 9, which is a screen shot taken from the NETSSWorks user interface and shows a one-line diagram of the balanced three-phase system operating in sinusoidal steady state. In the equivalent terrestrial electric power system, each electric machine is modeled as a generator. Because they are loads, the propulsors are modeled as negative generators. The flywheel is modeled as a generator with both positive and negative generating capabilities, but in the examples shown herein, the flywheel is operated as a fixed negative generator drawing only standby power. The decision to model the electric machines as generators arises from the fact that NETSSWorks offers a richer set of optimization objective functions for generators than it does for loads.

Referring also to FIG. 9, Bus 1 models the speed voltage of the system generator, and Bus 2 models its terminals. Buses 1 and 2 are connected by a transmission line that models the stator resistance and inductance. In FIG. 9, these transmission lines are shown as the connections between Ld4 Terminal 11 and Ld4 Voltage 7; Ld2 Terminal 9 and Ld2 Voltage 5; Gen Terminal 2 and Gen Voltage 1; Ld3 Terminal 10 and Ld3 Voltage 6; and Ld1 Terminal 8 and Ld2 Voltage 4. Similarly, Buses 4, 5, 6, and 7 model the speed voltages, and Buses 8, 9, 10, and 11 model the terminals, of the four propulsors. The four propulsor speed voltages and terminals are also connected by transmission lines representing their respective resistances and inductances. The flywheel is modeled as a simple negative generator at Bus 12. The six electric machines are all connected to a common DC bus modeled by Bus 3. In the equivalent terrestrial electric power system, that connection is made through DC lines that contain models for the attendant rectifier and inverter power electronics. In FIG. 9, these DC lines are shown as the connections between: DC Star 3 and Ld4 Terminal 11; DC Star 3 and Ld2 Terminal 9; DC Star 3 and Gen Terminal 2; DC Star 3 and Ld3 Terminal 10; DC Star 3 and Ld1 Terminal 8; and DC Star 3 and Flywheel 12. The ratings for the six machines, expressed as generation, are given in Table 1.

TABLE 1

Ratings, expressed as generation, of the electric machines in the equivalent terrestrial electric power system.

| Machine | Generator | Propulsor | Flywheel |
| --- | --- | --- | --- |
| Minimum Power [MW] | 0 | −2.8 | −0.15 |
| Minimum Power [MW] | 11.35 | 0 | −0.15 |

NETSSWorks Set-Point Optimizations. NETSSWorks is used to optimize the static set points for the operation of the aircraft electric power system shown in FIG. 9. Two such sets of optimizations are reported here to illustrate how set points can be optimized. In the first set of optimizations, the propulsor powers are fixed in different patterns, and the machine voltages are optimized to minimize losses. In this case, the power from the main generator is a derived result equal to the propulsor and flywheel load powers plus losses. In the second set of optimizations, the four propulsors are assigned separate nonlinear profit functions that represent their "aerodynamic efficiency." In this case, its useful aerodynamic propulsion power is taken to be the electric power delivered to a propulsor times the aerodynamic efficiency of that propulsor. The objective of the optimization is then to maximize the total aerodynamic power of the four propulsors. This is achieved by optimally scheduling the distribution of power to each propulsor and the voltages at which all electric machines operate. It should be noted that the dynamic stability of the static set points optimized here is not guaranteed. Rather, the stability of the set points is verified through the simulations. For details see [NPL-05].

Table 2 shows the results of the first set of optimizations. Optimization #1 corresponds to each propulsor operating at half power. Optimization #2 corresponds to each propulsor operating at full power. Optimization #3 corresponds to each propulsor operating on average at half power, but with a linearly graded distribution of +30%, +10%, −10% and −30% for propulsors 1 through 4, respectively. These results were only weakly dependent on machine voltages, which generally fell within the range of 18-24 kV.

TABLE 2

Results from the first optimization set.

| Optimization | #1 | #2 | #3 |
| --- | --- | --- | --- |
| Generator Power [MW] | 5.762 | 11.317 | 5.762 |
| Propulsor 1 Power [MW] | 1.400 | 2.780 | 1.820 |
| Propulsor 2 Power [MW] | 1.400 | 2.780 | 1.540 |
| Propulsor 3 Power [MW] | 1.400 | 2.780 | 1.260 |
| Propulsor 4 Power [MW] | 1.400 | 2.780 | 0.980 |
| Flywheel Power [MW] | 0.150 | 0.150 | 0.150 |
| AC Losses [MW] | 0.005 | 0.019 | 0.005 |
| DC Loses [MW] | 0.007 | 0.028 | 0.007 |
| Efficiency [%] | 99.79 | 99.58 | 99.79 |

Because the numerical parameters characterizing losses within the machines—and particularly within the DC lines that model the power electronics—are not well known, it is not possible to draw numerical conclusions from the results shown in Table 1. Nonetheless, two observations can be made to offer credibility to the method. First, the losses as modeled are very small. This explains the weak dependence of the optimizations on machine voltage; small losses and fixed loads offer little opportunity for optimization. Second, it can be observed by comparing optimizations #1 and #2 that the efficiency of the power system falls as the power throughput rises. This is to be expected with roughly fixed machine voltages, because current will increase with primary power while losses will at least in part increase quadratically with current. Additionally, the efficiency of optimization #3 is lower than that for optimization #1, as expected. However, the difference is too small to be observed in Table 2.

In optimizations #4 through #8, each propulsor is assigned an aerodynamic efficiency. These efficiencies take the form $1-\alpha P_E$ where a is a parameter, and $P_E$ is the electrical power delivered to the propulsor. In this way, the aerodynamic power delivered by a propulsor is $P_E - \alpha P_E^2$. Thus, each propulsor becomes less aerodynamically efficient as the power through it increases. To make the optimization more interesting, the parameter $\alpha$ is graded across the propulsors. For example, the aerodynamic efficiency might depend upon the position of the propulsor along the wing. Table 3 shows the assumed efficiency parameters for the four propulsors. Note the 2.8 MW is the maximum electrical power of each propulsor.

TABLE 3

Propulsor efficiency parameters.

| Propulsor | #1 | #2 | #3 | #4 |
| --- | --- | --- | --- | --- |
| α [MW − 1] | 0.0 | 0.005 | 0.01 | 0.015 |
| Efficiency at PE = 2.8 MW | 1.0 | 0.986 | 0.972 | 0.958 |

Table 4 shows the results of optimizations #4 through #8. In these 5 optimizations, the electric power throughput is approximately 25%, 37.5%, 50%, 75%, and 100% of the maximum power throughput. Optimizations #4 through #6 might represent cruising, maneuvering, and take off powers during normal operation with both engines, all four generators, and all sixteen propulsors functioning. Optimizations #6 through #8 might represent cruising, maneuvering, and take off powers during emergency operation with one failed engine. In this case, the power through the two functioning generators and eight functioning propulsors would double.

TABLE 4

Results from the second optimization set.

| Optimization | #4 | #5 | #6 | #7 | #8 |
| --- | --- | --- | --- | --- | --- |
| Generator Power [MW] | 2.88 | 4.28 | 5.76 | 8.56 | 11.34 |
| Propulsor 1 Electric Power [MW] | 2.16 | 2.74 | 2.80 | 2.80 | 2.80 |
| Propulsor 2 Electric Power [MW] | 0.29 | 0.73 | 1.46 | 2.80 | 2.80 |
| Propulsor 3 Electric Power [MW] | 0.16 | 0.39 | 0.80 | 1.64 | 2.80 |
| Propulsor 4 Electric Power [MW] | 0.12 | 0.26 | 0.53 | 1.14 | 2.74 |
| Overall Efficiency [%] | 94.58 | 94.16 | 96.78 | 96.92 | 96.23 |
| Modified Overall Efficiency [%] | 99.78 | 99.65 | 99.37 | 98.65 | 98.29 |

The efficiencies listed in the next-to-last row of Table 4 compare the aerodynamic propulsor power to the generator power. However, this ratio treats the standby power of the flywheel as a loss. In order to more clearly see the effects of optimization, a modified efficiency is reported in the last row of Table 4. This efficiency compares the propulsor power to the generator power after subtraction of the standby flywheel power from the generator power.

Once again, because the electrical losses are not well parameterized, and because the aerodynamic efficiency of the propulsors is an innovation that makes the optimizations interesting, it is not possible to formulate numerical conclusions from the results of Table 4. Nonetheless, several observations can again be made to offer credibility to the method. First, power is allocated to those propulsors having higher efficiency: propulsor 1 receives the most power while propulsor 4 receives the least. Second, power is allocated to propulsors so as to maintain a constant marginal efficiency across all propulsors that have not reached their maximum electrical power of 2.8 MW. For example, propulsors 2, 3, and 4 all have the same marginal efficiency when considering system-wide electrical losses and aerodynamic efficiency. Because the optimization of the electric power system balances electrical losses and aerodynamic efficiency as it allocates electrical power to each propulsor, the optimization is highly nonlinear. Nonetheless, it computes in a fraction of a second, making it suitable for real-time set-point scheduling even as events occur that significantly modify the aircraft electric power system.

Multi-Layered Simulation of NETSSWorks Optimization and Closed-Loop Dynamics.

Scenario 1: Architecture 1—Left Engine Failure during Take-off, Left Electrical Systems Response. Initially, the system in Architecture 1 is operating at steady-state using the set points determined by the NETSSWorks optimization, shown in Table 5.

TABLE 5

Normal Conditions Set Points.

| Set Point | Value | Description |
|---|---|---|
| $P_{Gen1-Gen4}^{ref}$ | 5.754 MW | Reference for real power out of the induced voltage of all four generators |
| $Q_{Gen1-Gen4}^{ref}$ | 7.556 MW | Reference for reactive power out of the induced voltage of all four generators |
| $P_{Prop1-Prop16}^{ref}$ | 1.398 MW | Reference for real power into the induced voltage of all 16 propulsors (after the drop across stator windings) |
| $Q_{Prop1-Prop16}^{ref}$ | −1.5894 MW | Reference for reactive power into the induced voltage of all 16 propulsors (after the drop across stator windings) |
| $Q_{Fly1-Fly4}^{ref}$ | −0.1906 MW | Reference for reactive power into the resistor of all four flywheels (after the drop across the stator inductance but before the stator resistance) |
| $v_{DC1-DC4}^{ref}$ | 50 KV | Reference for voltage of all four DC-links |

Then after 0.1 seconds, the left engine fails. Here, we show that, for the left two electrical systems (which are connected to the left engine), the flywheel can be used to still deliver the reference power to the propulsors for a short amount of time following the disturbance.

Figure 10:
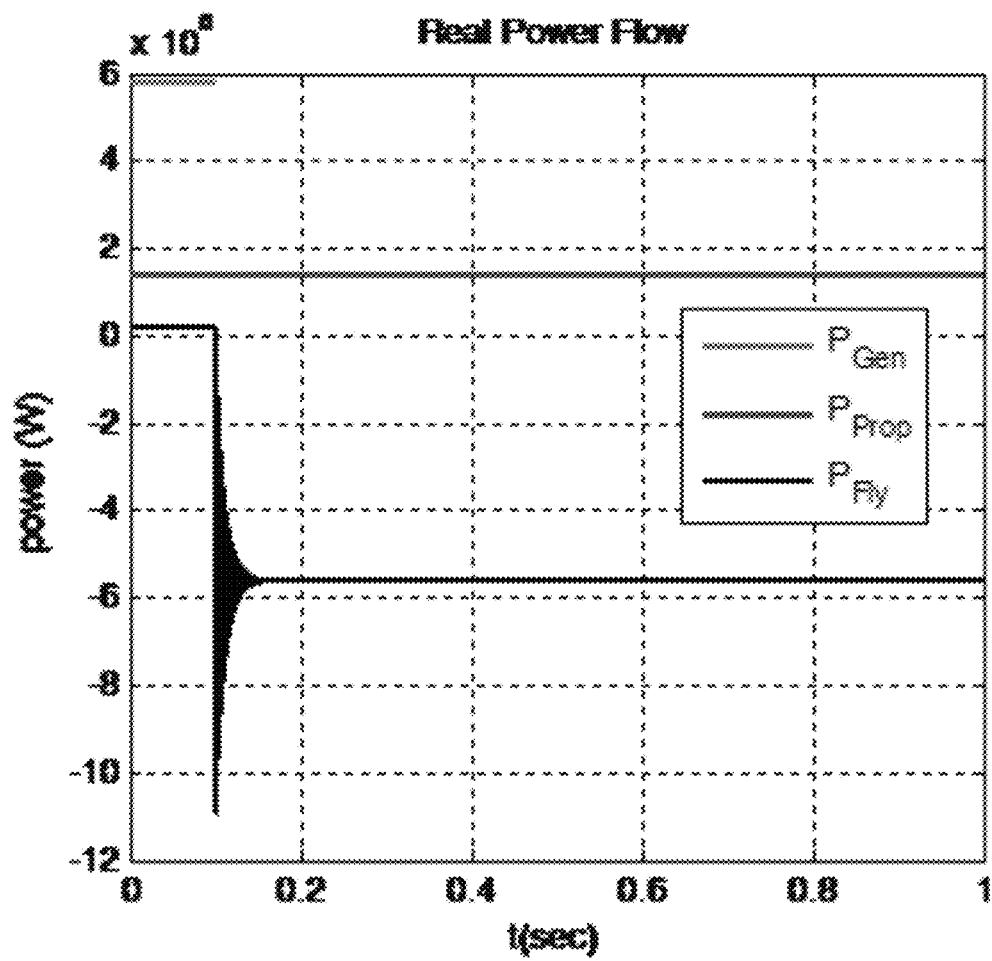
FIG. 10. Real power flow out of the generator, into each propulsor, and into the flywheel, for the left two electrical systems following the loss of the left engine in simulation Scenario #1.
Figure 11:
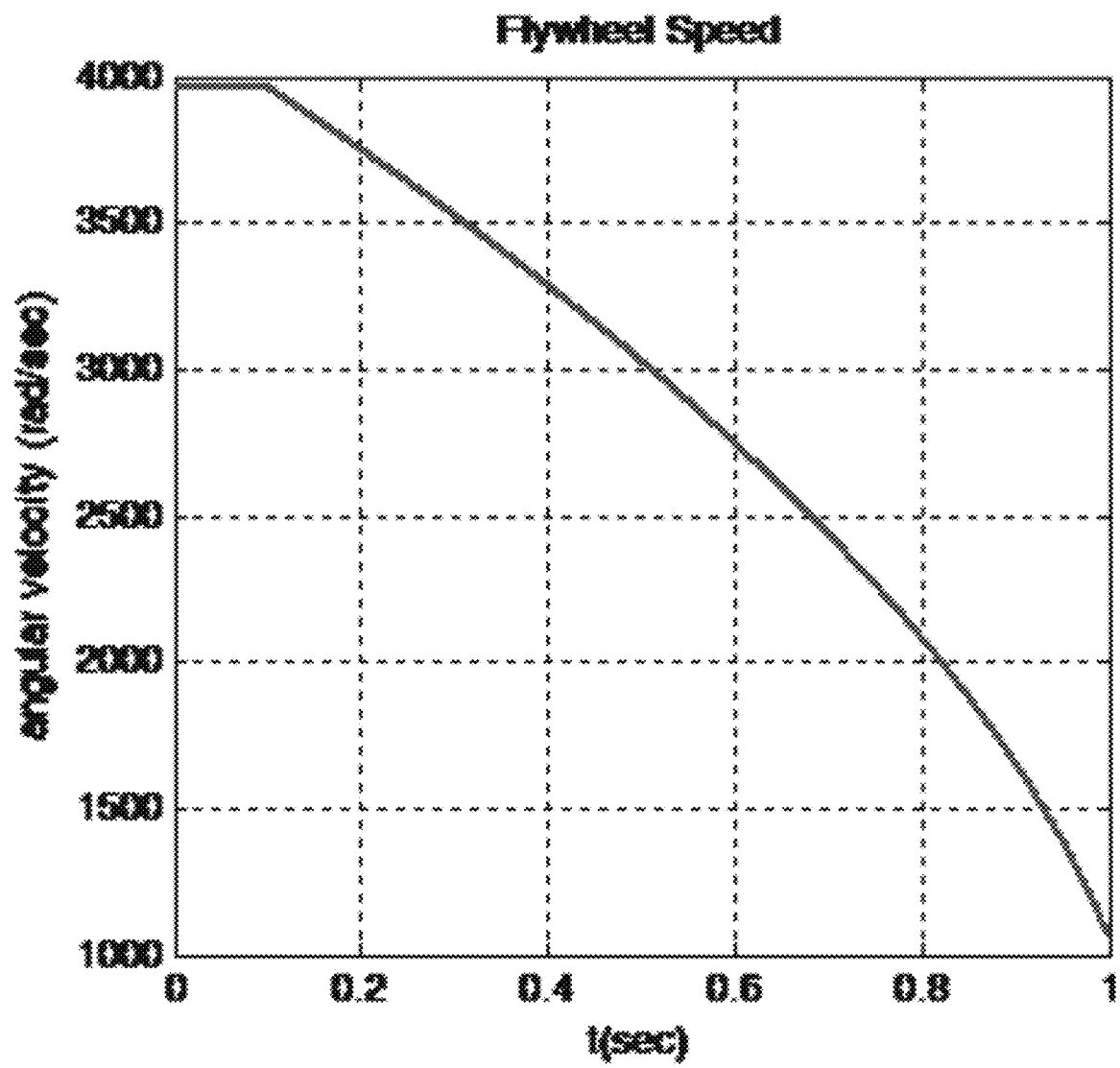
FIG. 11. Speed of the flywheel for the left two electrical systems following the loss of the left engine in simulation Scenario #1.

FIG. 10 shows the real power flow out of the generator, into each propulsor, and into the flywheel for the left two electrical systems following the loss of the left engine in simulation Scenario #1. As shown by FIG. 10, following the loss of the engine, the flywheel, rather than absorbing a small amount of power as in steady-state, is used to supply the power that the generator was supplying. We see that using this control strategy, the real power delivered to the propulsors is able to remain unaffected for a short amount of time following the disturbance. FIG. 11 shows the speed of the flywheel for the left two electrical systems following the loss of the left engine in simulation Scenario #1.

Figure 12:
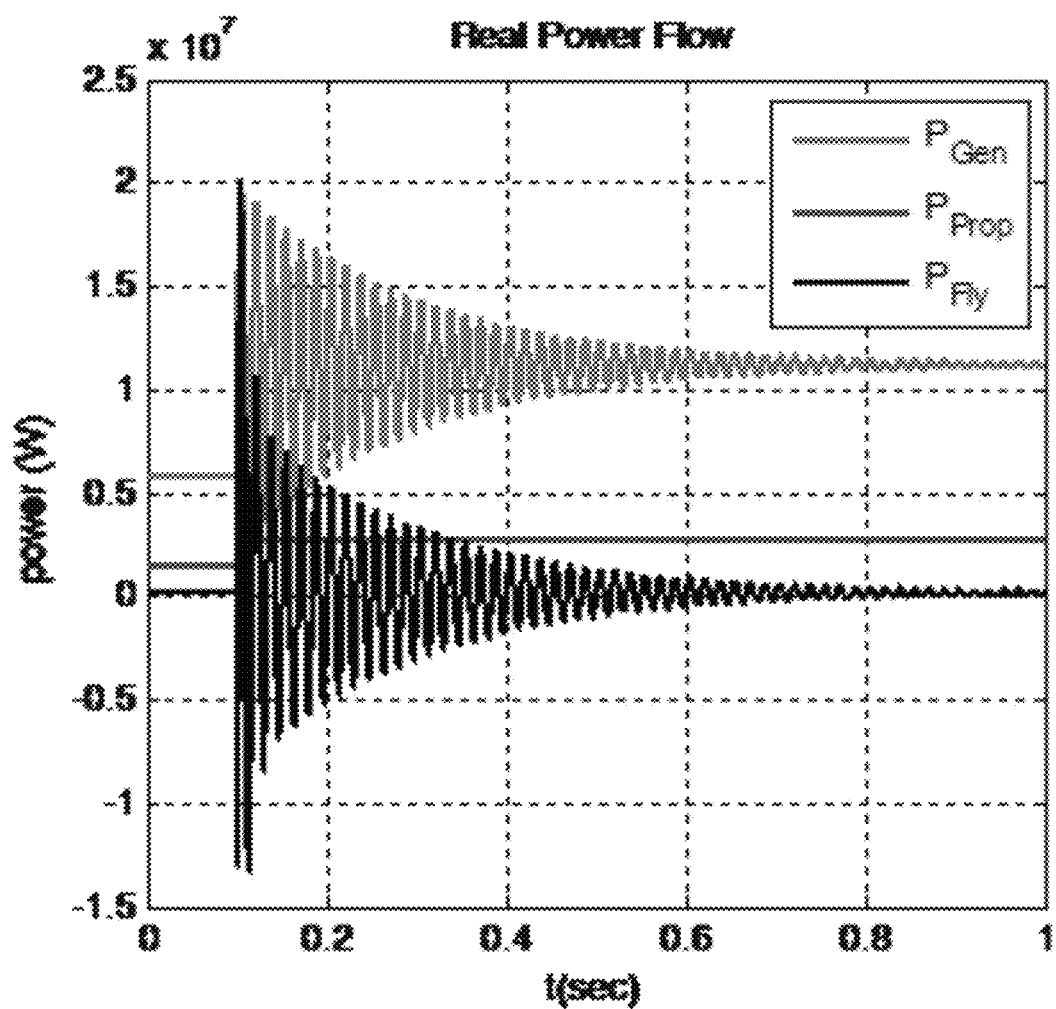
FIG. 12. Real power flow out of the generator, into each propulsor, and into the flywheel, for the right two electrical systems following the loss of the left engine in simulation Scenario #2.
Figure 13:
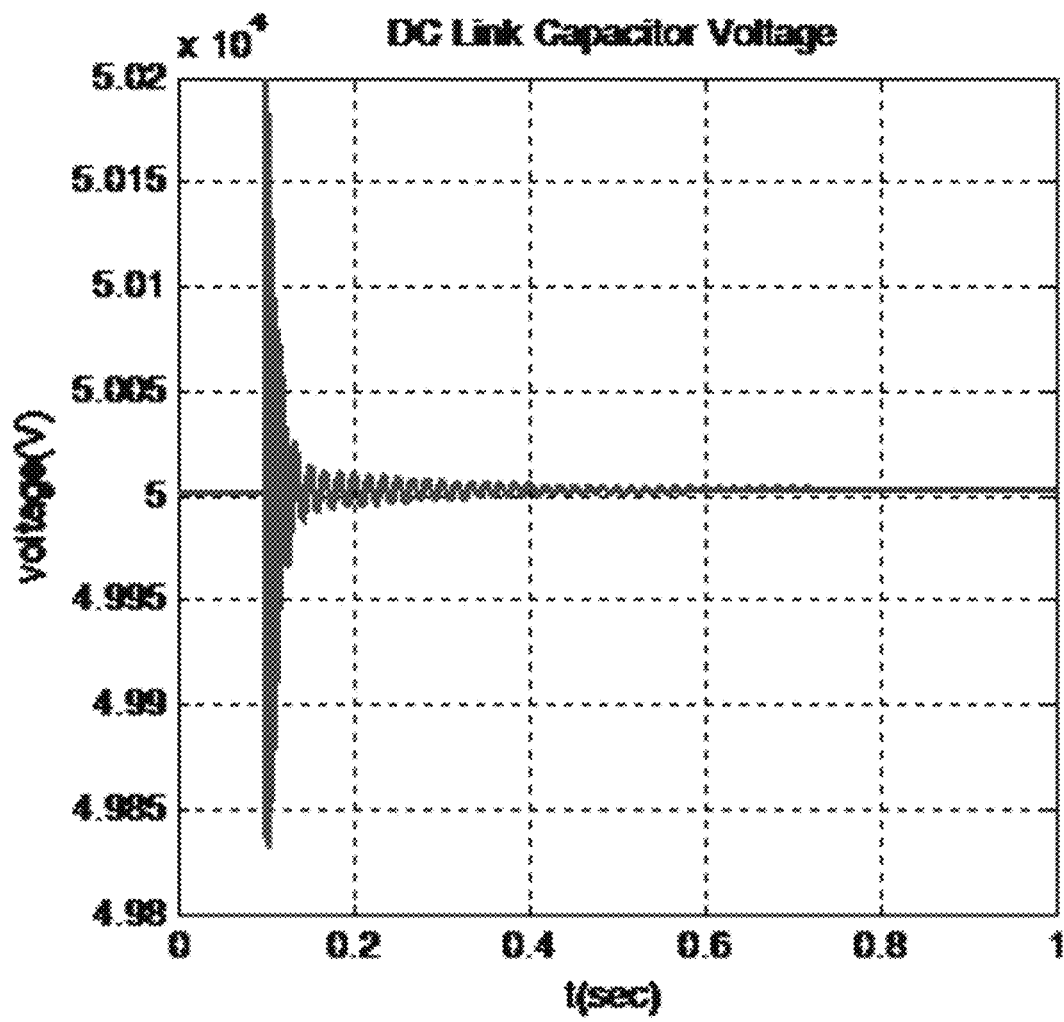
FIG. 13. DC-link capacitor voltage for the right two electrical systems following the loss of the left engine in simulation Scenario #2.

Scenario 2: Architecture 1—Left Engine Failure during Take-off, Right Electrical Systems Response. In FIG. 12 and FIG. 13, for the same example, we show the response of the two right electrical systems following the loss of the left engine. FIG. 12 shows the real power flow out of the generator, into each propulsor, and into the flywheel for the right two electrical systems following the loss of the left engine in simulation Scenario #2. FIG. 13 shows the DC-link capacitor voltage for the right two electrical systems following the loss of the left engine in simulation Scenario #2. When the left engine fails, the right generators must ramp up their power output, and the total power needed for takeoff must be delivered entirely to the right eight propulsors. The new set points following the loss of the engine are shown in Table 6.

TABLE 6

Set Points after Engine Failure Used for Simulation Scenario 2.

| Set Point | Value | Description |
|---|---|---|
| $P_{Gen3-Gen4}^{ref}$ | 11.19 MW | Reference for real power out of the induced voltage of the two right generators |
| $Q_{Gen3-Gen4}^{ref}$ | 15.1120 MW | Reference for reactive power out of the induced voltage of the right two generators |
| $P_{Prop9-Prop16}^{ref}$ | 2.75 MW | Reference for real power into the induced voltage for the right eight propulsors (after the drop across stator windings) |
| $Q_{Prop9-Prop16}^{ref}$ | −3.17888 MW | Reference for reactive power into the induced voltage for the right eight propulsors (after the drop across stator windings) |
| $Q_{Fly3-Fly4}^{ref}$ | −0.3812 MW | Reference for reactive power into the resistor of the right two flywheels (after the drop across the stator inductance but before the stator resistance) |
| $v_{DC3-DC4}^{ref}$ | 50 kV | Reference for voltage of the right two four DC-link |

Figure 14:
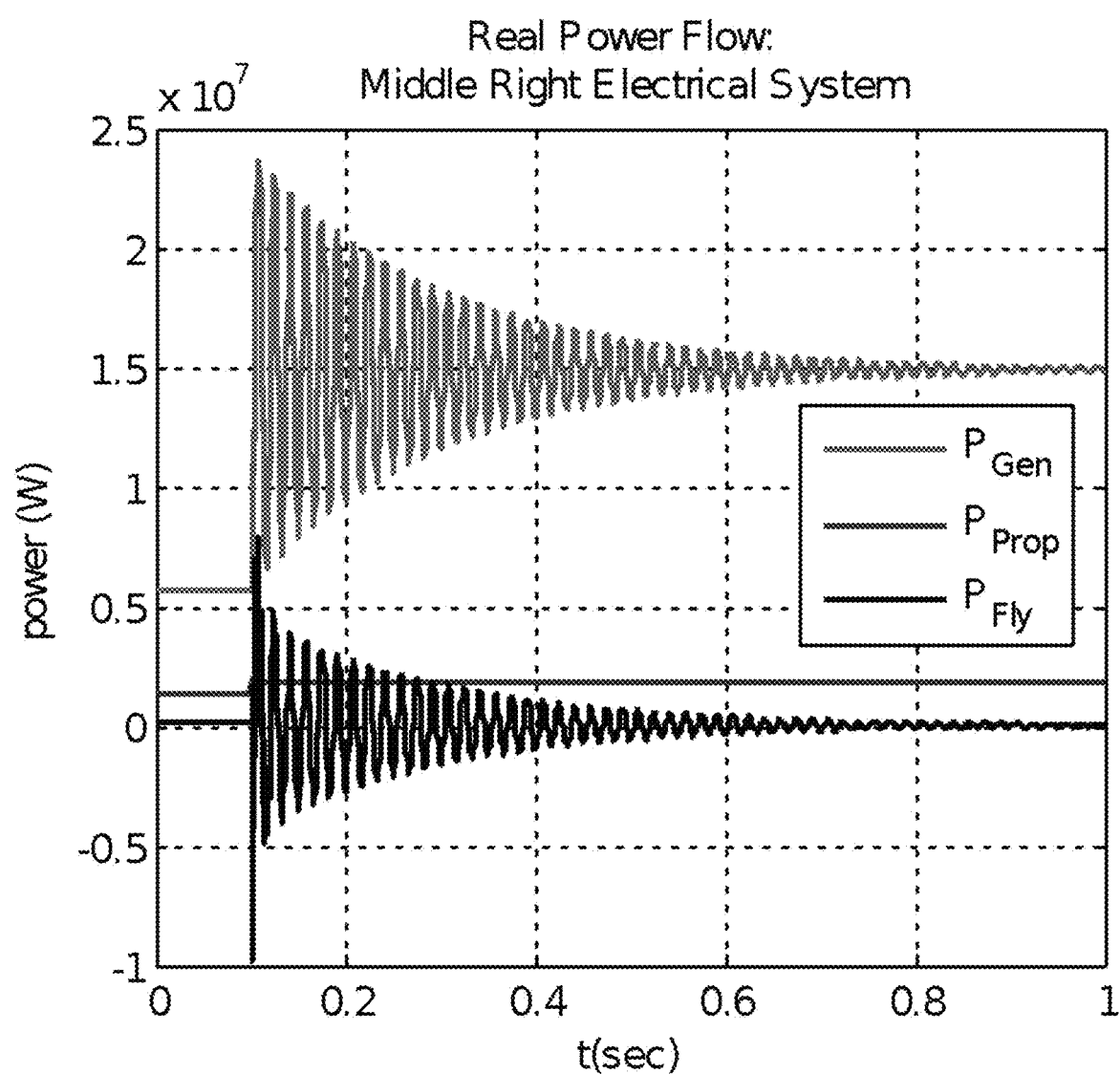
FIG. 14. Real power flow out of the generator, into each propulsor, and into the flywheel, for the middle right electrical system following the loss of the left engine in simulation Scenario #3.
Figure 15:
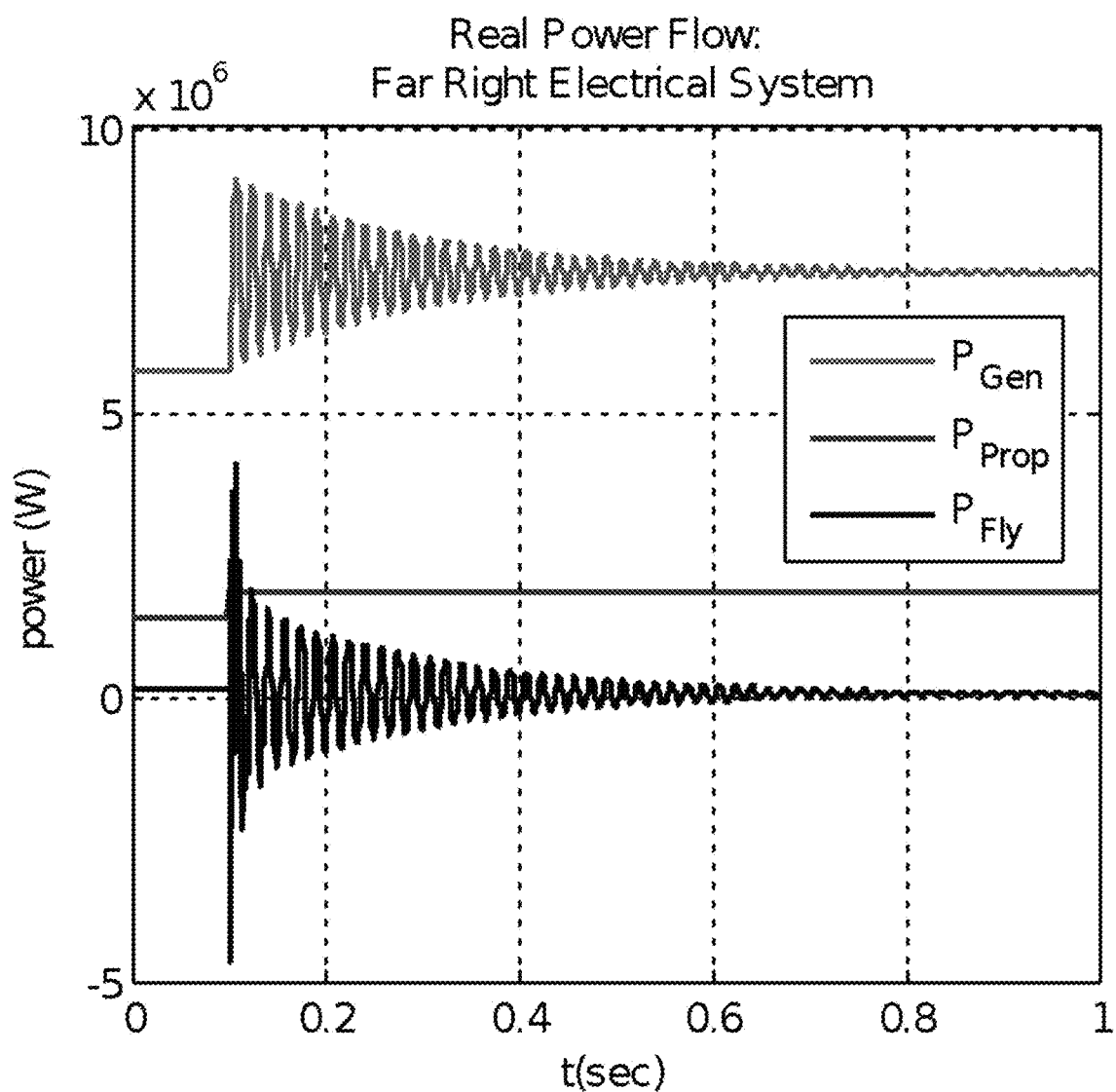
FIG. 15. Real power flow out of the generator, into each propulsor, and into the flywheel, for the far right electrical system following the loss of the left engine in simulation Scenario #3.

Scenario 3: Architecture 2—Left Engine Failure during Take-off. Initially, the system in Architecture 2 is operating at steady-state using the set points determined by the NETSSWorks optimization, shown in Table 7. Then after 0.1 seconds, the left engine fails. The right generators must ramp up their power output, and the total power needed for takeoff must be delivered entirely to the right eight propulsors and the middle left four propulsors (with the bus tie between the middle two electrical systems, power can still be delivered to the middle left four propulsors). The new set points following the loss of the engine are shown in Table 7. Note that the middle right generator and the far right generator have different real power set points. This is because as shown in FIG. 2, the middle right generator is sized larger. In FIG. 13 and FIG. 14, for the same example, we show the response of the two right electrical systems following the loss of the left engine.

TABLE 7

Set Points after Engine Failure Used for Simulation Scenario 3.

| Set Point | Value | Description |
|---|---|---|
| $P_{Gen3}^{ref}$ | 14.91 MW | Reference for real power out of the induced voltage of the middle right generator |
| $Q_{Gen3}^{ref}$ | 7.556 MW | Reference for reactive power out of the induced voltage of the middle right generator |
| $P_{Gen4}^{ref}$ | 7.46 MW | Reference for real power out of the induced voltage of the far right generator |
| $Q_{Gen4}^{ref}$ | 7.556 MW | Reference for reactive power out of the induced voltage of the far right generator |
| $P_{Prop9-Prop16}^{ref}$ | 1.85 MW | Reference for real power into the induced voltage for the right twelve propulsors (after the drop across stator windings) |
| $Q_{Prop9-Prop16}^{ref}$ | −1.5894 MW | Reference for reactive power into the induced voltage for the right twelve propulsors (after the drop across stator windings) |
| $Q_{Fly3-Fly4}^{ref}$ | −0.1906 MW | Reference for reactive power into the resistor of the right two flywheels (after the drop across the stator inductance but before the stator resistance) |
| $v_{DC3-DC4}^{ref}$ | 50 kV | Reference for voltage of the right two four DC-links |

Disclosed herein are methods and systems for autonomous stable energy management of aircraft/spacecraft turbo-electric distributed propulsion (TeDP) systems comprising: The overall systems and methods disclosed herein introduce a systematic physics-based framework for modeling, controlling, and optimizing complex TeDP aircraft systems. While these methods and systems are general and applicable to any given architecture, they are illustrated in terms of two qualitatively different aircraft system architectures. In the context of these two architectures, establishing one consistent modeling, control, and optimization framework includes the following steps:

(1) Providing high-level principles underlying a consistent modeling, control, and optimization method. (2) Providing a consistent physics-based modeling approach in support of the method. (3) Establishing multi-layered functionalities including (a) local models and automation to be embedded into different components in order to ensure stable and safe response to typical aircraft requirements for power; (b) system-level models and optimization of heterogeneous controllers supporting this automation for predictable ranges of operation (normal operation); and (c) system-level scheduling of controllers set points for hard-to-predict events (reliability). (4) Designing local control logic to ensure a provably stable and safe dynamic response. (5) Implementing optimization algorithms that are computationally robust over wide ranges of aircraft conditions and are integrated in order to optimize set points for automation. Whereby the framework applies to qualitatively different architectures.

This demonstrates a multi-layered control design for automation capable of stabilizing local component dynamics for the specified ranges of power outputs. This control design is very complex and based on a zoomed-in detailed model of component physics and its power electronics. The switching logic for power electronics is designed so that the dynamics of components is locally stabilized using the nonlinear controllers, such as passivity-based control.

This also demonstrates an end-to-end approach for systematic physics-based multi-Layered modeling, control, and optimization of diverse components interacting within a complex system in order to achieve a composite system that is safe, dynamically stable, and efficient. Through these efforts, one begins to enable more flexible utilization of equipment put in place for anticipated missions. Flexibility obtained by means of this method can significantly save on sizing of equipment when reliable operation is implemented by means of on-line automation and decision making.

OTHER EMBODIMENTS

Described herein are methods and systems for multi-layered, interactive, nonlinear power-electronically-switched control of AC-DC and DC-AC converters so the desired power is provided in transiently stable ways in response to varying aircraft conditions.

In another embodiment, these methods and systems extend to controlling electric power systems for single-vehicle manned deep-space missions.

In another embodiment, these methods and systems extend to controlling electric power systems for multi-vehicle manned deep-space missions.

In another embodiment, these methods and systems extend to controlling electric power systems for single-vehicle unmanned deep-space missions.

In another embodiment, these methods and systems extend to controlling electric power systems for multi-vehicle unmanned deep-space missions.

In another embodiment, these methods and systems generalize to include front-end and back-end aerodynamics and control interactions with the TeDP dynamics and control.

In another embodiment, these methods and systems adapt to controls for aircraft electric power systems requiring temporal progression of set-point changes in response to interconnected events in the operation of an aircraft. Of interest are normal events, such as the progression from takeoff to cruising, or different flight maneuvers. Also of interest are critical events involving power system equipment failures such as the loss of an engine, a generator, a propulsor or a part of the power system interconnect.

In another embodiment, different controllers are used, such as passivity based energy/power shaping controllers; their implementation uses fast power electronics switching.

In another embodiment, these methods and systems are used in Vertical Take-Off and Landing (VTOL) aircraft (en.wikipedia.org/wiki/VTOL_X-Plane) such as those by Aurora Flight Sciences.

In another embodiment, these methods and systems are used in NASA single-aisle turboelectric aircraft with an aft boundary layer propulsor (STARC-ABL) aircraft.

As will also be apparent to those skilled in the art, other higher-level optimizers (i.e. other than NETSSWorks) can be used for layer three, such system optimizer setting the best targets for local controllers. The system optimizer may be written in one of several widely available programming languages, and the modules may be coded as subroutines, subsystems, or objects depending on the language chosen. Furthermore, alternate embodiments that implement the system optimizer application in hardware, firmware, or a combination of both hardware and software, as well as distributing the modules and/or the data in a different fashion will be apparent to those skilled in the art and are also within the scope of this disclosure.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A system for providing feasible and stable power to an aircraft, comprising:
    a turbo-electric distributed propulsion system (TeDP) having:
        one or more generator modules, wherein each generator module includes a respective generator and a respective rectifier having one or more pairs of switches;
        one or more propulsor modules, wherein each propulsor module includes a respective propulsor, a respective inverter having one or more pairs of switches, and a respective permanent magnet synchronous machine with a governor;
    a direct current (DC) link module consisting of a DC link electrically coupling the one or more generator modules to the one or more propulsor modules and a single capacitor; and
    a flywheel module electrically coupled to the DC link module, wherein the flywheel module includes a flywheel, having a flywheel module permanent magnet synchronous machine, and a flywheel module inverter having one or more pairs of switches;
    one or more nonlinear dynamic power-electronic controllers connected to the modules of the TeDP holding operation of the TeDP to one or more set points, the one or more controllers include:
        a respective generator controller for each generator module, wherein each generator module is controlled by adjustment of the switches in that generator module's rectifier;

a respective propulsor controller for each propulsor module, and each propulsor module is controlled by adjustment of the switches in that propulsor module's inverter or speed adjustment through instructions to the governor;
a DC link controller; and
a flywheel controller;
a Dynamic Monitoring and Decision System comprising the one or more nonlinear dynamic power-electronic controllers connected through one or more communication links to a software implemented optimization system;
wherein the software implemented optimization system monitors the TeDP through the one or more controllers and determines the one or more set points;
wherein each generator controller regulates real and reactive power out of the respective generator module, each propulsor controller regulates real and reactive power into the respective propulsor module, and the flywheel controller regulates reactive power into the flywheel module according to respective values specified by the one or more set points; and
wherein the DC link controller gives a set point to the flywheel controller to regulate the DC link module voltage by regulating the flywheel module power.

2. A system for providing feasible and stable power to an aircraft, comprising:
a turbo-electric distributed propulsion system (TeDP) comprising:
one or more generator modules, wherein each generator module includes a respective generator and a respective rectifier having one or more pairs of switches;
one or more propulsor modules, wherein each propulsor module includes a respective propulsor and a respective inventor having one or more switches;
a direct current (DC) link module consisting of a DC link electrically coupling the one or more generator modules to the one or more propulsor modules and a single capacitor; and
a flywheel module electrically coupled to the DC link module, wherein the flywheel module includes a flywheel, a permanent magnet synchronous machine, and an inverter having one or more pairs of switches;
one or more nonlinear dynamic power-electronic controllers connected to the modules of the TeDP holding operation of the TeDP to one or more set points; and
a Dynamic Monitoring and Decision System comprising the one or more nonlinear dynamic power-electronic controllers connected through one or more communication links to a software implemented optimization system;
wherein the software implemented optimization system monitors the TeDP through the controllers and determines the one or more set points; and
wherein the one or more nonlinear dynamic power-electronic controllers regulate real and reactive power out of the one or more generator modules, regulate real and reactive power into the one or more propulsor modules, and regulate reactive power into the flywheel module and the DC link module voltage according to respective values specified by the one or more set points.

3. The system of claim 2, wherein the one or more controllers further includes a respective generator controller for each generator module, and each generator module is controlled by adjustment of the switches in that generator module's rectifier.

4. The system of claim 2, wherein each propulsor module includes a permanent magnet synchronous machine with a governor.

5. The system of claim 4, wherein the one or more controllers further includes a respective propulsor controller for each propulsor module, and each propulsor module is controlled by adjustment of the switches in that propulsor module's inverter or speed adjustment through instructions to the governor.

6. The system of claim 2, wherein the one or more controllers further comprise a generator controller for each generator module, a propulsor controller for each propulsor module, a DC link controller, and a flywheel controller.

7. The system of claim 6, wherein each generator controller regulates real and reactive power out of the respective generator module, each propulsor controller regulates real and reactive power into the respective propulsor module, and the flywheel controller regulates reactive power into the flywheel module.

8. The system of claim 7, wherein the DC link controller gives a set point to the flywheel controller to regulate the DC link module voltage by regulating the flywheel module power.

9. The system of claim 2, wherein the optimization system identifies the one or more set points such that total aerodynamic power of the one or more propulsor modules is maximized.

10. The system of claim 9, wherein the optimization system determines the aerodynamic power of each propulsor module based on the electric power delivered to that propulsor multiplied by an aerodynamic efficiency of that propulsor.

* * * * *